United States Patent
Duong et al.

(10) Patent No.: US 11,341,397 B1
(45) Date of Patent: *May 24, 2022

(54) COMPUTATION OF NEURAL NETWORK NODE

(71) Applicant: Perceive Corporation, San Jose, CA (US)

(72) Inventors: Kenneth Duong, San Jose, CA (US); Jung Ko, San Jose, CA (US); Steven L. Teig, Menlo Park, CA (US)

(73) Assignee: PERCEIVE CORPORATION, San Jose, CA (US)

( * ) Notice: Subject to any disclaimer, the term of this patent is extended or adjusted under 35 U.S.C. 154(b) by 640 days.

This patent is subject to a terminal disclaimer.

(21) Appl. No.: 16/212,618

(22) Filed: Dec. 6, 2018

Related U.S. Application Data

(60) Provisional application No. 62/773,164, filed on Nov. 29, 2018, provisional application No. 62/773,162, (Continued)

(51) Int. Cl.
*G06N 3/04* (2006.01)
*G06N 3/063* (2006.01)
(Continued)

(52) U.S. Cl.
CPC ........... *G06N 3/0481* (2013.01); *G06N 3/063* (2013.01); *G06N 3/084* (2013.01); *G06N 5/046* (2013.01); *G06N 20/00* (2019.01)

(58) Field of Classification Search
CPC ...... G06N 3/0481; G06N 3/063; G06N 3/084; G06N 3/046; G06N 20/00
See application file for complete search history.

(56) References Cited

U.S. PATENT DOCUMENTS

| 5,621,863 A | 4/1997 | Boulet et al. |
| 5,717,832 A | 2/1998 | Steimle et al. |

(Continued)

OTHER PUBLICATIONS

Boo, Yoonho, et al., "Structured Sparse Ternary Weight Coding of Deep Neural Networks for Efficient Hardware Implementations," 2017 IEEE Workshop on Signal Processing Systems (SiPS), Oct. 3-5, 2017, 6 pages, IEEE, Lorient, France.
(Continued)

*Primary Examiner* — Michael D. Yaary
(74) *Attorney, Agent, or Firm* — Adeli LLP

(57) ABSTRACT

Some embodiments provide a method for a neural network inference circuit (NNIC) that implements a neural network including multiple computation nodes at multiple layers. Each computation node includes a dot product of input values and weight values and a set of post-processing operations. The method retrieves a set of weight values and a set of input values for a computation node from a set of memories of the NNIC. The method computes a dot product of the retrieved sets of weight values and input values. The method performs the post-processing operations for the computation node on a result of the dot product computation to compute an output value for the computation node. The method stores the output value in the set of memories. No intermediate results of the dot product or the set of post-processing operations are stored in any RAM of the NNIC during the computation.

24 Claims, 19 Drawing Sheets

Related U.S. Application Data filed on Nov. 29, 2018, provisional application No. 62/753,878, filed on Oct. 31, 2018, provisional application No. 62/742,802, filed on Oct. 8, 2018, provisional application No. 62/724,589, filed on Aug. 29, 2018, provisional application No. 62/660,914, filed on Apr. 20, 2018.

(51) Int. Cl.
```
G06N 20/00      (2019.01)
G06N 5/04       (2006.01)
G06N 3/08       (2006.01)
```

(56) References Cited

U.S. PATENT DOCUMENTS

| | | | |
|---|---|---|---|
| 5,740,326 | A | 4/1998 | Boulet et al. |
| 5,956,703 | A | 9/1999 | Turner et al. |
| 9,904,874 | B2 | 2/2018 | Shoaib et al. |
| 10,445,638 | B1 | 10/2019 | Amirineni et al. |
| 10,489,478 | B2 | 11/2019 | Lim et al. |
| 10,768,856 | B1 | 9/2020 | Diamant et al. |
| 11,170,289 | B1 | 11/2021 | Duong et al. |
| 11,205,115 | B1 | 12/2021 | Duong et al. |
| 2004/0078403 | A1 | 4/2004 | Scheuermann et al. |
| 2016/0239706 | A1 | 8/2016 | Dijkman et al. |
| 2017/0011288 | A1 | 1/2017 | Brothers et al. |
| 2017/0300828 | A1 | 10/2017 | Feng et al. |
| 2017/0323196 | A1 | 11/2017 | Gibson et al. |
| 2018/0018559 | A1 | 1/2018 | Yakopcic et al. |
| 2018/0025268 | A1 | 1/2018 | Teig et al. |
| 2018/0046900 | A1 | 2/2018 | Dally et al. |
| 2018/0101763 | A1 | 4/2018 | Barnard et al. |
| 2018/0114569 | A1 | 4/2018 | Strachan et al. |
| 2018/0121796 | A1 | 5/2018 | Deisher et al. |
| 2018/0197068 | A1 | 7/2018 | Narayanaswami et al. |
| 2018/0246855 | A1 | 8/2018 | Redfern et al. |
| 2018/0285726 | A1 | 10/2018 | Baum et al. |
| 2018/0293493 | A1* | 10/2018 | Kalamkar ............... G06T 1/20 |
| 2018/0293691 | A1 | 10/2018 | Nurvitadhi et al. |
| 2018/0300600 | A1* | 10/2018 | Ma ............... G06N 3/063 |
| 2018/0307494 | A1 | 10/2018 | Ould-Ahmed-Vall et al. |
| 2018/0307950 | A1 | 10/2018 | Nealis et al. |
| 2018/0315158 | A1 | 11/2018 | Nurvitadhi et al. |
| 2018/0373975 | A1 | 12/2018 | Yu et al. |
| 2019/0012296 | A1 | 1/2019 | Hsieh et al. |
| 2019/0026078 | A1 | 1/2019 | Bannon et al. |
| 2019/0026237 | A1 | 1/2019 | Talpes et al. |
| 2019/0026249 | A1 | 1/2019 | Talpes et al. |
| 2019/0073585 | A1 | 3/2019 | Pu et al. |
| 2019/0114499 | A1 | 4/2019 | Delaye et al. |
| 2019/0138891 | A1 | 5/2019 | Kim et al. |
| 2019/0171927 | A1 | 6/2019 | Diril et al. |
| 2019/0187983 | A1 | 6/2019 | Ovsiannikov et al. |
| 2019/0205358 | A1 | 7/2019 | Diril et al. |
| 2019/0205736 | A1 | 7/2019 | Bleiweiss et al. |
| 2019/0205739 | A1 | 7/2019 | Liu et al. |
| 2019/0236445 | A1 | 8/2019 | Das et al. |
| 2019/0294413 | A1 | 9/2019 | Vantrease et al. |
| 2019/0303749 | A1 | 10/2019 | Appuswamy et al. |
| 2019/0332925 | A1 | 10/2019 | Modha |
| 2020/0042856 | A1 | 2/2020 | Datta et al. |
| 2020/0042859 | A1 | 2/2020 | Mappouras et al. |
| 2020/0089506 | A1 | 3/2020 | Power et al. |
| 2020/0134461 | A1 | 4/2020 | Chai et al. |
| 2021/0173787 | A1 | 6/2021 | Nagy et al. |
| 2021/0241082 | A1 | 8/2021 | Nagy et al. |

OTHER PUBLICATIONS

Achterhold, Jan, et al., "Variational Network Quantization," Proceedings of 6th International Conference on Learning Representations (ICLR 2018), Apr. 30-May 3, 2018, 18 pages, ICLR, Vancouver, BC, Canada.

Andri, Renzo, et al., "YodaNN: An Architecture for Ultra-Low Power Binary-Weight CNN Acceleration," IEEE Transactions on Computer-Aided Design of Integrated Circuits and Systems, Mar. 14, 2017, 14 pages, IEEE, New York, NY, USA.

Ardakani, Arash, et al., "Sparsely-Connected Neural Networks: Towards Efficient VLSI Implementation of Deep Neural Networks," Proceedings of the 5th International Conference on Learning Representations (ICLR 2017), Apr. 24-26, 2017, 14 pages, ICLR, Toulon, France.

Bagherinezhad, Hessam, et al., "LCNN: Look-up Based Convolutional Neural Network," Proceedings of 2017 IEEE Conference on Computer Vision and Pattern Recognition (CVPR 2017), Jul. 21-26, 2017, 10 pages, IEEE, Honolulu, HI, USA.

Bang, Suyoung, et al., "A 288pW Programmable Deep-Learning Processor with 270KB On-Chip Weight Storage Using Non-Uniform Memory Hierarchy for Mobile Intelligence," Proceedings of 2017 IEEE International Solid-State Circuits Conference (ISSCC 2017), Feb. 5-7, 2017, 3 pages, IEEE, San Francisco, CA, USA.

Bong, Kyeongryeol, et al., "A 0.62mW Ultra-Low-Power Convolutional-Neural-Network Face-Recognition Processor and a CIS Integrated with Always-On Haar-Like Face Detector," Proceedings of 2017 IEEE International Solid-State Circuits Conference (ISSCC 2017), Feb. 5-7, 2017, 3 pages, IEEE, San Francisco, CA, USA.

Chen, Yu-Hsin, et al., "Eyeriss: A Spatial Architecture for Energy-Efficient Dataflow for Convolutional Neural Networks," Proceedings of 2016 ACM/IEEE 43rd Annual International Symposium on Computer Architecture (ISCA 2016), Jun. 18-22, 2016, 13 pages, IEEE, Seoul, South Korea.

Chen, Yu-Hsin, et al., "Using Dataflow to Optimize Energy Efficiency of Deep Neural Network Accelerators," IEEE Micro, Jun. 14, 2017, 10 pages, vol. 37, Issue 3, IEEE, New York, NY, USA.

Courbariaux, Matthieu et al., "Binarized Neural Networks: Training Neural Networks with Weights and Activations Constrained to +1 or −1," Mar. 17, 2016, 11 pages, arXiv:1602.02830v3, Computing Research Repository (CoRR)—Cornell University, Ithaca, NY, USA.

Courbariaux, Mai I Hieu, et al., "BinaryConnect: Training Deep Neural Networks with Binary Weights during Propagations," Proceedings of the 28th International Conference on Neural Information Processing Systems (NIPS 15), Dec. 7-12, 2015, 9 pages, MIT Press, Montreal, Canada.

Emer, Joel, et al., "Hardware Architectures for Deep Neural Networks," CICS/MTL Tutorial, Mar. 27, 2017, 258 pages, Massachusetts Institute of Technology, Cambridge, MA, USA, retrieved from http://www.rle.mit.edu/eems/wp-content/uploads/2017/03/Tutorial-on-DNN-CICS-MTL.pdf.

Fu, Yao, et al., "Embedded Vision with INT8 Optimization on Xilinx Devices," WP490 (v1.0.1), Apr. 19, 2017, 15 pages, Xilinx, Inc., San Jose, CA, USA.

Guo, Yiwen, et al., "Network Sketching: Exploring Binary Structure in Deep CNNs," 2017 IEEE Conference on Computer Vision and Pattern Recognition (CVPR 2017), Jul. 21-26, 2017, 9 pages, IEEE, Honolulu, HI.

He, Zhezhi, et al., "Optimize Deep Convolutional Neural Network with Ternarized Weights and High Accuracy," Jul. 20, 2018, 8 pages, arXiv:1807.07948v1, Computing Research Repository (CoRR)—Cornell University, Ithaca, NY, USA.

Hegde, Kartik, et al., "UCNN: Exploiting Computational Reuse in Deep Neural Networks via Weight Repetition," Proceedings of the 45th Annual International Symposium on Computer Architecture (ISCA '18), Jun. 2-6, 2018, 14 pages, IEEE Press, Los Angeles, CA, USA.

Huan, Yuxiang, et al., "A Low-Power Accelerator for Deep Neural Networks with Enlarged Near-Zero Sparsity," May 22, 2017, 5 pages, arXiv:1705.08009v1, Computer Research Repository (CoRR)—Cornell University, Ithaca, NY, USA.

Jouppi, Norman, P., et al., "In-Datacenter Performance Analysis of a Tensor Processing Unit," Proceedings of the 44th Annual International Symposium on Computer Architecture (ISCA '17), Jun. 24-28, 2017, 17 pages, ACM, Toronto, ON, Canada.

Judd, Patrick, et al., "Cnvlutin2: Ineffectual-Activation-and-Weight-Free Deep Neural Network Computing," Apr. 29, 2017, 6 pages, arXiv:1705.00125v1, Computer Research Repository (CoRR)—Cornell University, Ithaca, NY, USA.

(56) References Cited

OTHER PUBLICATIONS

Leng, Cong, et al., "Extremely Low Bit Neural Network: Squeeze the Last Bit Out with ADMM," Proceedings of 32nd AAAI Conference on Artificial Intelligence (AAAI-18), Feb. 2-7, 2018, 16 pages, Association for the Advancement of Artificial Intelligence, New Orleans, LA, USA.
Li, Fengfu, et al., "Ternary Weight Networks," May 16, 2016, 9 pages, arXiv:1605.04711v1, Computing Research Repository (CoRR)—Cornell University, Ithaca, NY, USA.
Merolla, Paul, et al., "Deep Neural Networks are Robust to Weight Binarization and Other Non-linear Distortions," Jun. 7, 2016, 10 pages, arXiv:1606.01981v1, Computing Research Repository (CoRR)—Cornell University, Ithaca, NY, USA.
Moons, Bert, et al., "Envision: A 0.26-to-10TOPS/W Subword-Parallel Dynamic-Voltage-Accuracy-Frequency-Scalable Convolutional Neural Network Processor in 28nm FDSOI," Proceedings of 2017 IEEE International Solid-State Circuits Conference (ISSCC 2017), Feb. 5-7, 2017, 3 pages, IEEE, San Francisco, CA, USA.
Moshovos, Andreas, et al., "Exploiting Typical Values to Accelerate Deep Learning," Computer, May 24, 2018, 13 pages, vol. 51-Issue 5, IEEE Computer Society, Washington, D.C.
Non-published commonly owned U.S. Appl. No. 16/212,616, filed Dec. 6, 2018, 72 pages, Perceive Corporation.
Non-published commonly owned U.S. Appl. No. 16/212,617, filed Dec. 6, 2018, 72 pages, Perceive Corporation.
Non-published commonly owned U.S. Appl. No. 16/212,621, filed Dec. 6, 2018, 73 pages, Perceive Corporation.
Non-published commonly owned U.S. Appl. No. 16/212,622, filed Dec. 6, 2018, 72 pages, Perceive Corporation.
Park, Jongsoo, et al., "Faster CNNs with Direct Sparse Convolutions and Guided Pruning," Jul. 28, 2017, 12 pages, arXiv:1608.01409v5, Computer Research Repository (CoRR)—Cornell University, Ithaca, NY, USA.
Rastegari, Mohammad, et al., "XNOR-Net: ImageNet Classification Using Binary Convolutional Neural Networks," Proceedings of 2016 European Conference on Computer Vision (ECCV '16), Oct. 8-16, 2016, 17 pages, Lecture Motes in Computer Science, vol. 9908, Springer, Cham, Amsterdam, Netherlands.
Ren, Mengye, et al., "SBNet: Sparse Blocks Network for Fast Inference," Jan. 7, 2018, 10 pages, arXiv:1801.02108v1, Computer Research Repository (CoRR)—Cornell University, Ithaca, NY, USA.
Shayer, Oran, et al., "Learning Discrete Weights Using the Local Reparameterization Trick," Proceedings of 6th International Conference on Learning Representations (ICLR 2018), Apr. 30-May 3, 2018, 12 pages, ICLR, Vancouver, BC, Canada.
Shin, Dongjoo, et al., "DNPU: An 8.1TOPS/W Reconfigurable CNN-RNN Processor for General-Purpose Deep Neural Networks," Proceedings of 2017 IEEE International Solid-State Circuits Conference (ISSCC 2017), Feb. 5-7, 2017, 3 pages, IEEE, San Francisco, CA, USA.
Sim, Jaehyeong, et al., "A 1.42TOPS/W Deep Convolutional Neural Network Recognition Processor for Intelligent IoE Systems," Proceedings of 2016 IEEE International Solid-State Circuits Conference (ISSCC 2016), Jan. 31-Feb. 4, 2016, 3 pages, IEEE, San Francisco, CA, USA.
Sze, Vivienne, et al., "Efficient Processing of Deep Neural Networks: A Tutorial and Survey," Aug. 13, 2017, 32 pages, arXiv:1703.09039v2, Computer Research Repository (CoRR)—Cornell University, Ithaca, NY, USA.
Wang, Min, et al., "Factorized Convolutional Neural Networks," 2017 IEEE International Conference on Computer Vision Workshops (ICCVW '17), Oct. 22-29, 2017, 9 pages, IEEE, Venice, Italy.
Wen, Wei, et al., "Learning Structured Sparsity in Deep Neural Networks," Oct. 18, 2016, 10 pages, arXiv:1608.03665v4, Computer Research Repository (CoRR)—Cornell University, Ithaca, NY, USA.
Yang, Xuan, et al., "DNN Dataflow Choice is Overrated," Sep. 10, 2018, 13 pages, arXiv:1809.04070v1, Computer Research Repository (CoRR)—Cornell University, Ithaca, NY, USA.
Zhang, Shijin, et al., "Cambricon-X: An Accelerator for Sparse Neural Networks," 2016 49th Annual IEEE/ACM International Symposium on Microarchitecture (MICRO '16), Oct. 15-19, 2016, 12 pages, IEEE, Taipei, Taiwan.
Zhu, Chenzhuo, et al., "Trained Ternary Quantization," Dec. 4, 2016, 9 pages, arXiv:1612.01064v1, Computing Research Repository (CoRR)—Cornell University, Ithaca, NY, USA.

\* cited by examiner

1200

| Inputs | | | | | Output | | | |
|---|---|---|---|---|---|---|---|---|
| IN[4] | IN[3] | IN[2] | IN[1] | IN[0] | OUT[3] | OUT[2] | OUT[1] | OUT[0] |
| 0 | 0 | 0 | 0 | 0 | 0 | 0 | 0 | 0 |
| 0 | 0 | 0 | 0 | 1 | 0 | 0 | 0 | 1 |
| 0 | 0 | 0 | 1 | 0 | 0 | 0 | 1 | 0 |
| 0 | 0 | 0 | 1 | 1 | 0 | 0 | 1 | 1 |
| 0 | 0 | 1 | 0 | 0 | 0 | 1 | 0 | 0 |
| 0 | 0 | 1 | 0 | 1 | 0 | 1 | 0 | 1 |
| 0 | 0 | 1 | 1 | 0 | 0 | 1 | 1 | 0 |
| 0 | 0 | 1 | 1 | 1 | 0 | 1 | 1 | 1 |
| 0 | 1 | 0 | 0 | 0 | 1 | 0 | 0 | 0 |
| 0 | 1 | 0 | 0 | 1 | 1 | 0 | 0 | 1 |
| 0 | 1 | 0 | 1 | 0 | 1 | 0 | 1 | 0 |
| 0 | 1 | 0 | 1 | 1 | 1 | 0 | 1 | 1 |
| 0 | 1 | 1 | 0 | 0 | 1 | 1 | 0 | 0 |
| 0 | 1 | 1 | 0 | 1 | 1 | 1 | 0 | 1 |
| 0 | 1 | 1 | 1 | 0 | 1 | 1 | 1 | 0 |
| 0 | 1 | 1 | 1 | 1 | 1 | 1 | 1 | 1 |
| 1 | 0 | 0 | 0 | 0 | 0 | 0 | 0 | 0 |
| 1 | 0 | 0 | 0 | 1 | 0 | 0 | 0 | 0 |
| 1 | 0 | 0 | 1 | 0 | 0 | 0 | 0 | 0 |
| 1 | 0 | 0 | 1 | 1 | 0 | 0 | 0 | 0 |
| 1 | 0 | 1 | 0 | 0 | 0 | 0 | 0 | 0 |
| 1 | 0 | 1 | 0 | 1 | 0 | 0 | 0 | 0 |
| 1 | 0 | 1 | 1 | 0 | 0 | 0 | 0 | 0 |
| 1 | 0 | 1 | 1 | 1 | 0 | 0 | 0 | 0 |
| 1 | 1 | 0 | 0 | 0 | 0 | 0 | 0 | 0 |
| 1 | 1 | 0 | 0 | 1 | 0 | 0 | 0 | 0 |
| 1 | 1 | 0 | 1 | 0 | 0 | 0 | 0 | 0 |
| 1 | 1 | 0 | 1 | 1 | 0 | 0 | 0 | 0 |
| 1 | 1 | 1 | 0 | 0 | 0 | 0 | 0 | 0 |
| 1 | 1 | 1 | 0 | 1 | 0 | 0 | 0 | 0 |
| 1 | 1 | 1 | 1 | 0 | 0 | 0 | 0 | 0 |
| 1 | 1 | 1 | 1 | 1 | 0 | 0 | 0 | 0 |

*Figure 12*

COMPUTATION OF NEURAL NETWORK NODE

BACKGROUND

In a typical neural network, a standard computation is a dot product between input values (activations) and weight values. A typical way for an integrated circuit to compute these weight values is to use multiply-accumulate (MAC) circuits that repeatedly perform the multiplication of an input value by a weight value, adds that to an existing partial dot product, and stores the new partial dot product. However, this requires numerous clock cycles, as each term in the dot product computed by a MAC uses a separate cycle. In addition, the storage of each intermediate term requires the use of memory (contributing to both slowing down of the computation and use of resources for the read/write operations). Accordingly, techniques for parallelization without massively expanding the surface area of the circuit are required.

BRIEF SUMMARY

Some embodiments provide an integrated circuit (IC) for implementing a machine-trained network (e.g., a neural network). The IC of some embodiments includes a set of input processing circuits, a neural network computation fabric that can be configured to apply a neural network to an input value, and a microprocessor (e.g., for controlling the input processing circuits and configuring the neural network computation fabric). The neural network computation fabric of some embodiments includes (i) a set of cores that compute dot products of input values and corresponding weight values and (ii) a channel that aggregates these dot products and performs post-processing operations (as well as performs other operations), in order to compute the outputs of neural network computation nodes.

In some embodiments, at startup of the IC, the microprocessor loads neural network configuration data (e.g., weight values, scale and bias parameters, etc.) from off-chip storage and generates instructions for the neural network computation fabric to write the neural network parameters to memory. In addition, microprocessor loads the neural network program instructions for the computation fabric to its own memory. These instructions are applied by the computation fabric to input data (e.g., images, audio clips, etc.) in order to execute the neural network. The instructions include, e.g., the memory locations to which input values are written, configuration data specifying how to compute specific neural network nodes, etc. Upon receiving input data (e.g., from a sensor on a device that incorporates the IC), the microprocessor provides neural network program instructions to the computation fabric. Once the final output of the neural network is computed, the fabric provides this output back to the microprocessor, so that the microprocessor (or other circuitry on the device) can evaluate this output and perform any actions based on the output.

The microprocessor executes a controller, in some embodiments, that provides the neural network instructions to the computation fabric. Some embodiments provide these instructions to the computation fabric incrementally. For instance, in some embodiments, the system controller on the microprocessor initially loads the instructions for the first layer (or a first portion of the first layer) of the neural network, then waits for a signal from the fabric indicating that these instructions have been completed. Once the first portion of the network is completed by the fabric, the system controller provides the fabric with the instructions for the second portion (either a second portion of the first layer, or the second layer of the network), and so on until the network has been fully executed.

In some embodiments, the computation fabric includes a hierarchical control structure for providing configuration data to the computation circuits of the fabric. The computation fabric of some embodiments includes (i) a fabric controller for interacting with the system controller on the microprocessor, (ii) a set of cluster controllers, and (iii) a set of core controllers. In some embodiments, the dot product cores are grouped into clusters, and the connecting channel includes separate segments for each such cluster. The channel also includes one of the cluster controllers, and each of the cores includes a core controller.

The fabric controller parses the instructions from the system controller to identify which cores are active for those instructions and also uses data stored in its local memory to unpack the fabric-level instructions. The fabric controller provides cluster instructions to the controllers for identified clusters that are in use for the current neural network layer (especially during the initial layers of a neural network when dot product computations are smaller, avoiding the use of some of the clusters provides power savings), and additionally synchronizes these cluster controllers. This synchronization ensures that dot products computed across multiple clusters are aggregated together correctly.

Each of the cluster controllers configures its own segment of the global channel (these circuits are described below) in addition to parsing the instructions to identify configuration data for each of the cores in its cluster. The cluster controllers provide the appropriate configuration data to each of the core controllers, which coordinate the dot product processing in the core. This includes various memory read operations (and, eventually, write operations after the computation node operations are completed in the global channel) as well as addition operations, described in more detail below. Once the instructions are fully executed, the core controllers send completion signals to the cluster controllers. Similarly, once the cluster controllers receive these completion messages, they send similar messages to the fabric controller, which can then notify the system controller in the microprocessor that the instructions are complete (so that the system controller provides the next set of instructions).

As mentioned, the neural network computation fabric includes numerous cores as well as a global channel that connects the cores, with the various data processing circuits configured by the hierarchical set of control circuits. These data processing circuits operate to compute neural network operations in an efficient, low-power manner, according to the configuration data provided by the control circuits.

A typical neural network operates in layers, with each layer including numerous nodes. Examples of neural networks include feed-forward neural networks, regulatory feedback networks, radial basis function networks, recurrent networks, etc. In convolutional neural networks (a type of feed-forward network), a majority of the layers include computation nodes with both a linear function followed by a non-linear activation function (applied to the result of the linear function). The linear function is a dot product of input values (either the initial inputs based on the input data for the first layer, or outputs of the previous layer for subsequent layers) and predetermined (trained) weight values, along with bias (addition) and scale (multiplication) terms, which are also predetermined based on training. As such, for convolutional neural networks, the dot products are the primary computation that uses the most circuit resources.

The neural network computation circuit of some embodiments computes numerous neural network nodes simultaneously, with the computation for one node spread across multiple cores (and subsequently the global channel). That is, each of several cores of the computation fabric computes a partial dot product from a subset of the input values and weight values for the node. In some embodiments, a set of input values are used as the input to multiple nodes in a layer, so a core simultaneously computes the dot products of these input values with multiple sets of weight values. Similarly, a set of weight values (referred to as a filter, or filter slice when that filter is divided across multiple cores) are used as the weights for numerous nodes with different sets of input values, so in some embodiments the cores load sets of weight values once and then compute dot products of these weight values with numerous different sets of input values.

For a dot product computed across more than one core, these multiple cores compute partial dot products and provide these partial dot products to the global channel. In the simplest case, all of the partial dot products for a given computation node are computed in the same clock cycle and provided at the same time to the global channel. In some cases, however (e.g., for dot products with a very large number of terms), each core computes more than one partial dot product, requiring multiple clock cycles. Based on configuration data specifying which outputs from the cores are to be added together (and whether multiple partial dot products are required from the same core), the global channel aggregates these partial dot products to compute the complete dot product for each node, then applies various post-processing functions (e.g., the bias, scale, and non-linear activation functions) to compute the output of each node.

In some embodiments, each segment of the global channel includes (in addition to the cluster controllers) a dot product bus, a set of post-processing circuits, and an output bus. The dot product bus, in some embodiments, includes a number of independent dot product bus lanes that each receives partial dot products from the cores, aggregates these dot products together, and provides the aggregated dot products to the post-processing circuits. In some embodiments, configuration data from the cluster controllers specifies to which post-processing unit each aggregated dot product is sent. Each lane of the dot product bus spans all of the channel segments, each of which aggregates the partial dot products from its own cores. These aggregated values are then aggregated together by additional circuits of the dot product bus lane, and configuration data specifies whether to pass the aggregated dot products in one direction of the segment or the other, or whether that segment is the final aggregator for the dot product (in which case that aggregated dot product is provided to a post-processing unit in that segment).

In some embodiments, each segment includes the same number of post-processing units as dot product bus lanes, with each post-processing unit receiving the output of a different dot product bus lane as its primary input. The post-processing units, as mentioned, perform the non-dot product functions of the neural network nodes. For a typical computation node of a convolutional (or fully-connected) layer, this includes a bias factor, a scaling factor, and a non-linear activation function. In some embodiments, the outputs of the linear function are quantized or truncated to a particular number of bits (e.g., 4 bits). Using a small, fixed number of bits for the outputs of each computation node allows for (i) power and resource savings by enabling smaller computations and (ii) certainty in the scheduling of computations (i.e., by knowing that all input values will be within a particular range) that enables further power and resource savings in design.

The non-linear activation function, in some embodiments, is implemented as a lookup table rather than a hardwired function. This enables the IC to execute different neural networks that use different activation functions and, in some embodiments, allows for different activation functions to be used in different layers of the neural network. For instance, in addition to common activation functions such as the Rectified Linear Unit (RELU), periodic activation functions, etc. are possible. In some embodiments, the lookup table circuit receives a truth-table (e.g., a 4-bit to 4-bit or 5-bit to 4-bit mapping) as configuration data in order to implement the non-linear activation function.

In addition to these operations, in some embodiments the post-processing units include additional circuitry for (i) performing additional dot product operations if required and (ii) performing operations for neural network computation nodes that do not use dot products. The post-processing units of some embodiments each have the ability to combine dot products from two separate cycles if a dot product is too large to be computed in a single cycle across the cores of the computation fabric. In addition, if a particular filter slice needs to be split across multiple cores (because of too many non-zero weight values, as described in greater detail below), the post-processing unit is configured to account for that. Furthermore, some embodiments enable dot products to be double the size of the standard quantized output (e.g., 8-bit rather than 4-bit) by using dot products from multiple cycles and bit-shifting the first set of input data.

Neural network computation nodes that do not use dot products include, for example, pooling layers of convolutional networks (e.g., average pooling and max pooling layers) as well as nodes that perform element-wise operations. In some of these embodiments, the cores provide input values directly to the post-processing units without computing dot products, and the post-processing units are configured to perform the appropriate operations on these inputs.

The output bus carries the computation node outputs from the post-processing units back to the cores, to be stored in the memory of the core and used as inputs for the next layer of neural network computation nodes. In some embodiments, the output values may be computed by post-processing units in one cluster but carried to a core in another cluster to be stored. For efficiency, the compiler of some embodiments (a software program that generates the configuration data for enabling the IC to execute a particular neural network) attempts to optimize the location of the post-processing unit for each computation node output relative to the cores used to compute the constituent partial dot products for that computation node and the destination core for the output value.

As mentioned, the cores compute partial dot products in parallel that are provided to the dot product bus of the local channel segment. In some embodiments, the weight values for each layer of the network are ternary values (e.g., each weight is either zero, a positive value, or the negation of the positive value), with at least a fixed percentage (e.g., 75%) of the weight values being zero. As such, some embodiments reduce the size of the dot product computation circuits by mapping each of a first number (e.g., 144) input values to a second number (e.g., 36) of dot product inputs, such that each dot product input only receives at most one input value with a non-zero corresponding weight value.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 12 illustrates an example of a truth table representing an activation function.

DETAILED DESCRIPTION

Some embodiments provide an integrated circuit (IC) for implementing a machine-trained network (e.g., a neural network). The IC of some embodiments includes a set of input processing circuits, a neural network computation fabric (also referred to as a neural network inference circuit) that can be configured to apply a neural network to a set of input values, and a microprocessor (e.g., for controlling the input processing circuits and configuring the neural network computation fabric). The neural network computation fabric of some embodiments includes (i) a set of cores that compute dot products of input values and corresponding weight values and (ii) a channel that aggregates these dot products and performs post-processing operations (as well as performs other operations), in order to compute the outputs of neural network computation nodes.

Figure 1:
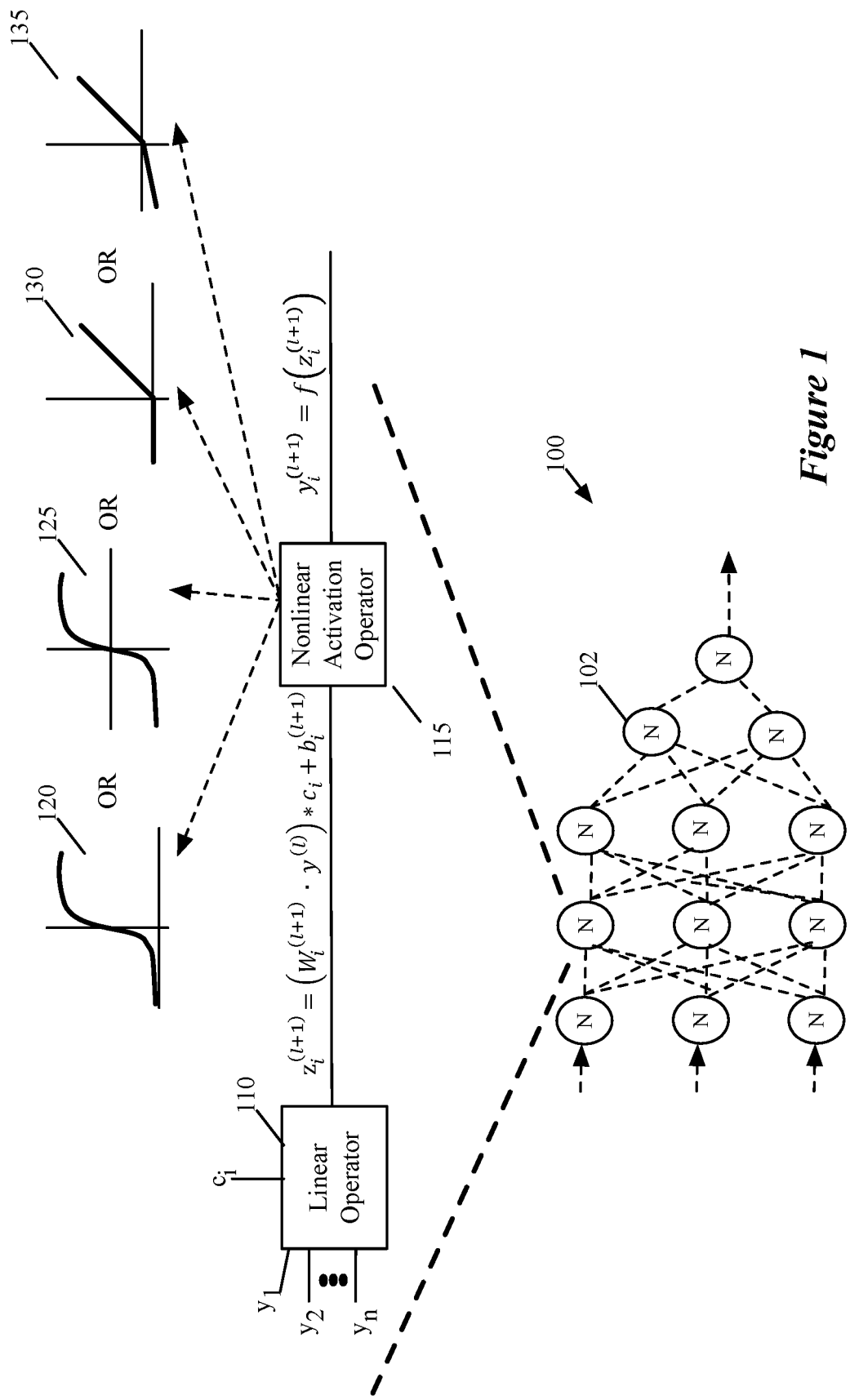
FIG. 1 illustrates an example of a multi-layer machine-trained network of some embodiments.

FIG. 1 illustrates an example of a multi-layer machine-trained network of some embodiments. This figure illustrates a feed-forward neural network 100 that has multiple layers of processing nodes 102 (also called neurons). In all but the first (input) and last (output) layer, each node 102 receives two or more outputs of nodes from earlier processing node layers and provides its output to one or more nodes in subsequent layers. The output of the node (or nodes) in the last layer represents the output of the network 100. In different embodiments, the output of the network 100 is a number in a range of values (e.g., 0 to 1), a vector representing a point in an N-dimensional space (e.g., a 128-dimensional vector), or a value representing one of a predefined set of categories (e.g., for a network that classifies each input into one of eight possible outputs, the output could be a three-bit value).

In this example, the neural network 100 only has one output node. Other neural networks of other embodiments have several output nodes that provide more than one output value. Furthermore, while the network 100 includes only a few nodes 102 per layer, a typical neural network may include a varying number of nodes per layer (with some layers having several thousand nodes) and significantly more layers than shown (e.g., several dozen layers). In addition, the neural networks of other embodiments may be types of networks other than feed forward networks (e.g., recurrent networks, regulatory feedback networks, radial basis function networks, etc.).

The illustrated network 100 is a fully-connected network in which each node in a particular layer receives as inputs all of the outputs from the previous layer. However, the neural networks of some embodiments are convolutional feed-forward neural networks. In this case, the intermediate layers (referred to as "hidden" layers) may include convolutional layers, pooling layers, fully-connected layers, and normalization layers. The convolutional layers of some embodiments use a small kernel (e.g., 3×3×3) to process each tile of pixels in an image with the same set of parameters. The kernels (also referred to as filters) are three-dimensional, and multiple kernels are used to process each group of input values in in a layer (resulting in a three-dimensional output). Pooling layers combine the outputs of clusters of nodes from one layer into a single node at the next layer, as part of the process of reducing an image (which may have a large number of pixels) or other input item down to a single output (e.g., a vector output). In some embodiments, pooling layers can use max pooling (in which the maximum value among the clusters of node outputs is selected) or average pooling (in which the clusters of node outputs are averaged).

As shown in FIG. 1, each node in the neural network 100 has a linear component 110 and a nonlinear component 115. The linear component 110 of each hidden or output node in this example computes a dot product of a vector of weight coefficients and a vector of output values of prior nodes, plus an offset. In other words, a hidden or output node's linear operator computes a weighted sum of its inputs (which are outputs of the previous layer of nodes) plus an offset (also referred to as a bias). Similarly, the linear component 110 of each input node of some embodiments computes a dot product of a vector of weight coefficients and a vector of input values, plus an offset. In other embodiments, each input node receives a single input and passes that input as its output. Each node's nonlinear component 115 computes a function based on the output of the node's linear component 110. This function is commonly referred to as the activation function, and the outputs of the node (which are then used as inputs to the next layer of nodes) are referred to as activations.

The notation of FIG. 1 can be described as follows. Consider a neural network with L hidden layers (i.e., L layers that are not the input layer or the output layer). The variable l can be any of the hidden layers (i.e., l∈{1, ..., L−1} index the hidden layers of the network, with l=0 representing the input layer and l=L representing the output layer). The variable $z_i^{(l+1)}$ represents the output of the linear component of a hidden node i in layer l+1. As indicated by the following Equation (A), the variable $z_i^{(l+1)}$ is computed as the dot product of a vector of weight values $W_i^{(l+1)}$ and a vector of outputs $y^{(l)}$ from layer l multiplied by a constant value $c_i$, and offset by a bias value $b_i$:

$$z_i^{(l+1)} = \left(W_i^{(l+1)} \cdot y^{(l)}\right) * c_i + b_i^{(l+1)} = \sum_{k=1}^{n} \left(w_{ik}^{(l+1)} * y_k^{(l)}\right) * c_i + b_i^{(l+1)}. \quad (A)$$

The constant value $c_i$ is a value to which all the weight values are normalized. In some embodiments, the constant value $c_i$ is 1. The symbol * is an element-wise product, while the symbol · is the dot product. The weight coefficients $W^{(l)}$ are parameters that are adjusted during the network's training in order to configure the network to solve a particular problem (e.g., object or face recognition in images, voice analysis in audio, depth analysis in images, etc.). In some embodiments, the training algorithm imposes certain constraints on the weight values. Specifically, some embodiments impose a ternary constraint that requires all of the weight values for any given layer to be either zero, a positive value, or a negation of the positive value (e.g., 0, 1, and −1). In addition, some embodiments use a training technique that maximizes the number of weight values that are equal to zero (such that, e.g., 75% or 90% of the weight values equal zero).

The output $y^{(l+1)}$ of the nonlinear component 115 of a node in layer l+1 is a function of the node's linear component, and can be expressed as by Equation (B) below:

$$y_i^{(l+1)} = f(z_i^{(l+1)}). \quad (B)$$

In this equation, f is the nonlinear activation function for node i. Examples of such activation functions include a sigmoid function 120 ($f(x)=1/(1+e^{-x})$), a tanh function 125, a ReLU (rectified linear unit) function 130 or a leaky ReLU function 135, as shown.

Traditionally, the sigmoid function and the tanh function have been the activation functions of choice. More recently, the ReLU function ($f(x)=\max(0, x)$) has been proposed for the activation function in order to make it easier to compute the activation function. See Nair, Vinod and Hinton, Geoffrey E., "Rectified linear units improve restricted Boltzmann machines," ICML, pp. 807-814, 2010. Even more recently, the leaky ReLU has been proposed in order to simplify the training of the processing nodes by replacing the flat section (i.e., x<0) of the ReLU function with a section that has a slight slope. See He, Kaiming, Zhang, Xiangyu, Ren, Shaoqing, and Sun, Jian, "Delving deep into rectifiers: Surpassing human-level performance on imagenet classification," arXiv preprint arXiv:1502.01852, 2015. In some embodiments, the activation functions can be other types of functions, like cup functions and periodic functions.

Equation (B) can be expressed in the following expanded format of Equation (C):

$$y_i^{(l+1)} = f(z_i^{(l+1)}) = f\left[\left(\sum_{k=1}^{n} w_{ik} * y_k\right) * c_i + b_i^{(l+1)}\right]. \quad (C)$$

In this equation, $w_{ik}$ are weight values associated with the inputs $y_k$ of the node i in layer l+1.

Before a multi-layer network can be used to solve a particular problem, the network is put through a supervised training process that adjusts the network's configurable parameters (e.g., the weight coefficients of its linear components). The training process iteratively selects different input value sets with known output value sets. For each selected input value set, the training process typically (1) forward propagates the input value set through the network's nodes to produce a computed output value set and then (2) backpropagates a gradient (rate of change) of a loss function (output error) that quantifies in a particular way the difference between the input set's known output value set and the input set's computed output value set, in order to adjust the network's configurable parameters (e.g., the weight values).

As mentioned, some embodiments provide an IC that implements a machine-trained network such as that shown in FIG. 1. The ICs of some embodiments are configurable to implement different networks trained to perform a particular function, which may have various different arrangements of nodes and different trained weight values. For instance, the ICs may implement networks for object or facial recognition in images, voice recognition in audio samples, etc. The IC of some embodiments includes a set of input processing circuits, a neural network computation fabric that can be configured to apply a neural network to an input value, and a microprocessor (e.g., for controlling the input processing circuits and configuring the neural network computation fabric.

Figure 2:
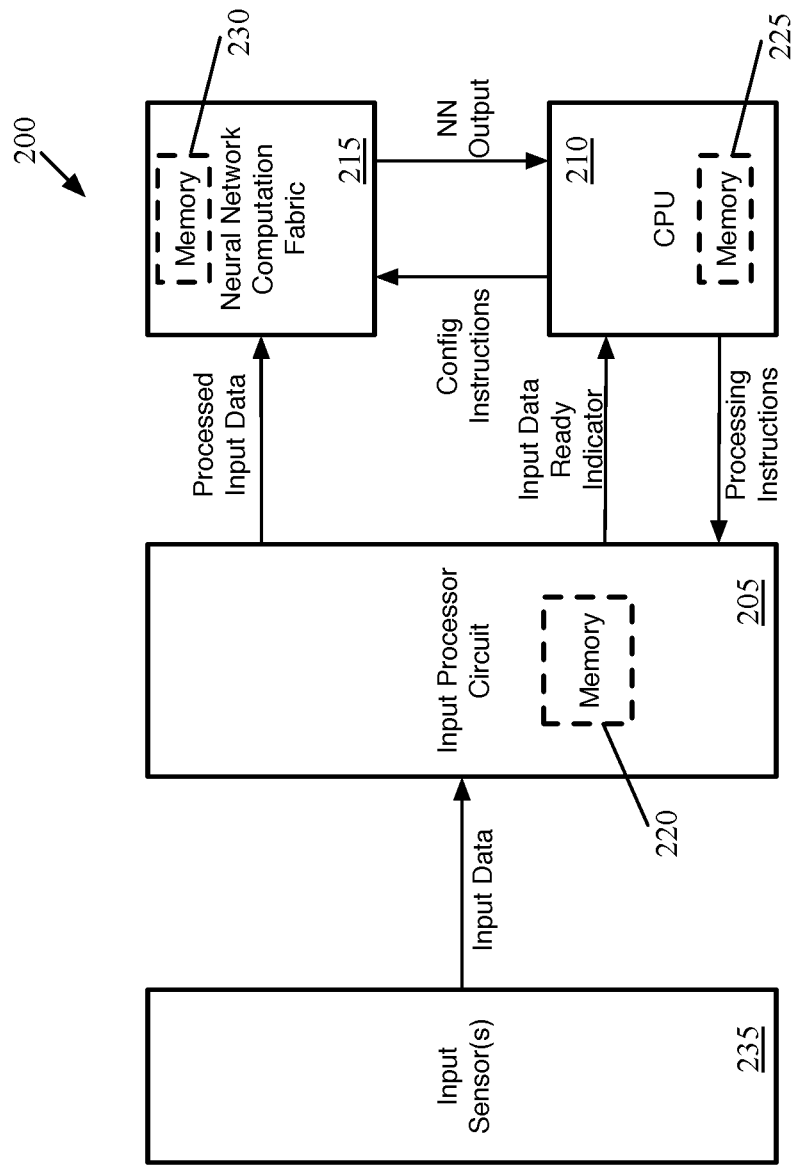
FIG. 2 conceptually illustrates an integrated circuit of some embodiments.

FIG. 2 conceptually illustrates such an IC 200 of some embodiments. As shown, the IC includes an input processor circuit 205, a microprocessor (CPU) 210, and a neural network computation fabric 215. Each of these components 205-215 also has corresponding memory (e.g., random access memory (RAM)) 230. In addition, in some embodiments, the IC is integrated into a device (such as an Internet of Things (IOT) device) with one or more input sensors 235. These input sensors can include cameras (e.g., for capturing video images on which the neural network computation fabric 215 performs face or object recognition, etc.), microphones (e.g., for capturing audio on which the neural network computation fabric 215 performs voice recognition, speech processing, etc.), or other types of input sensors. In other embodiments, the input sensors 235 are located on a separate device that is linked with the IC 200.

In some embodiments, at bootup of the IC 200, the CPU 210 loads neural network configuration data (e.g., weight values, scale and bias parameters, lookup table masks for each layer, memory locations for the weight and input values to use for computing each layer of the network, etc.) from off-chip storage and generates instructions for the neural network computation fabric 215 to write the weight values and other data to its memory 230. In addition, CPU 210 loads the neural network program instructions for the computation fabric to its own memory 225. These instructions are applied by the computation fabric 215 to input data in order to execute the neural network. These runtime instructions include, e.g., indications as to which pre-loaded sets of instructions to use for each set of calculations, etc.

The input processor circuit 205 receives input data (e.g., still images or video frames, sounds, etc.) from the input sensor(s) 235, and processes these according to processing instructions received from the CPU 210. The CPU 210 stores in its memory instructions for the input processor circuit to prepare input data for the computation fabric 215 as well as the neural network program instructions. These instructions identify, in some embodiments, any sort of initial processing to apply to the raw data (e.g., decompression of compressed data, etc.) as well as how to arrange the data to be provided to the computation fabric 215. For an image, e.g., these instructions might specify the order in which the pixels should be arranged and streamed to the computation fabric 215, so that the computation fabric stores this data in the appropriate locations of its memory 230 for subsequent operations. The input processor circuit 205 also sends signals to the CPU 210 to indicate when it has fully buffered an input (e.g., a frame of video) and when the input is prepared to be sent to the computation fabric 215.

In addition to instructing the input processor circuit 205 how and when to provide input data to the computation fabric 215, the CPU 210 provides the neural network program instructions to the computation fabric. As described below, in some embodiments the CPU 210 provides these instructions in stages (e.g., one layer or portion of a layer at a time). Once the final output of the neural network is computed, the fabric 215 provides this output back to the CPU, so that the CPU (or other circuitry on the device) can evaluate this output and perform any actions based on the output.

Before describing the controller structure on the computation fabric and the parsing of configuration instructions in detail, an overview of the neural network computation fabric structure will be provided. The computation fabric of some embodiments provides a set of circuits for performing the various computations required for neural networks (e.g., dot product computations, scaler and bias operations, activation functions, etc.), with the network parameters (weight values, bias values, node arrangement, filter size, etc.) configurable. In some embodiments, the computation fabric imposes certain requirements on the networks, such as a maximum size of the network (i.e., a maximum size of the dot product computations), that the weight values be ternary (e.g., 0, $\alpha$, and $-\alpha$ for each layer of the network), and/or that at least a particular percentage of the weight values be equal to zero.

Figure 3:
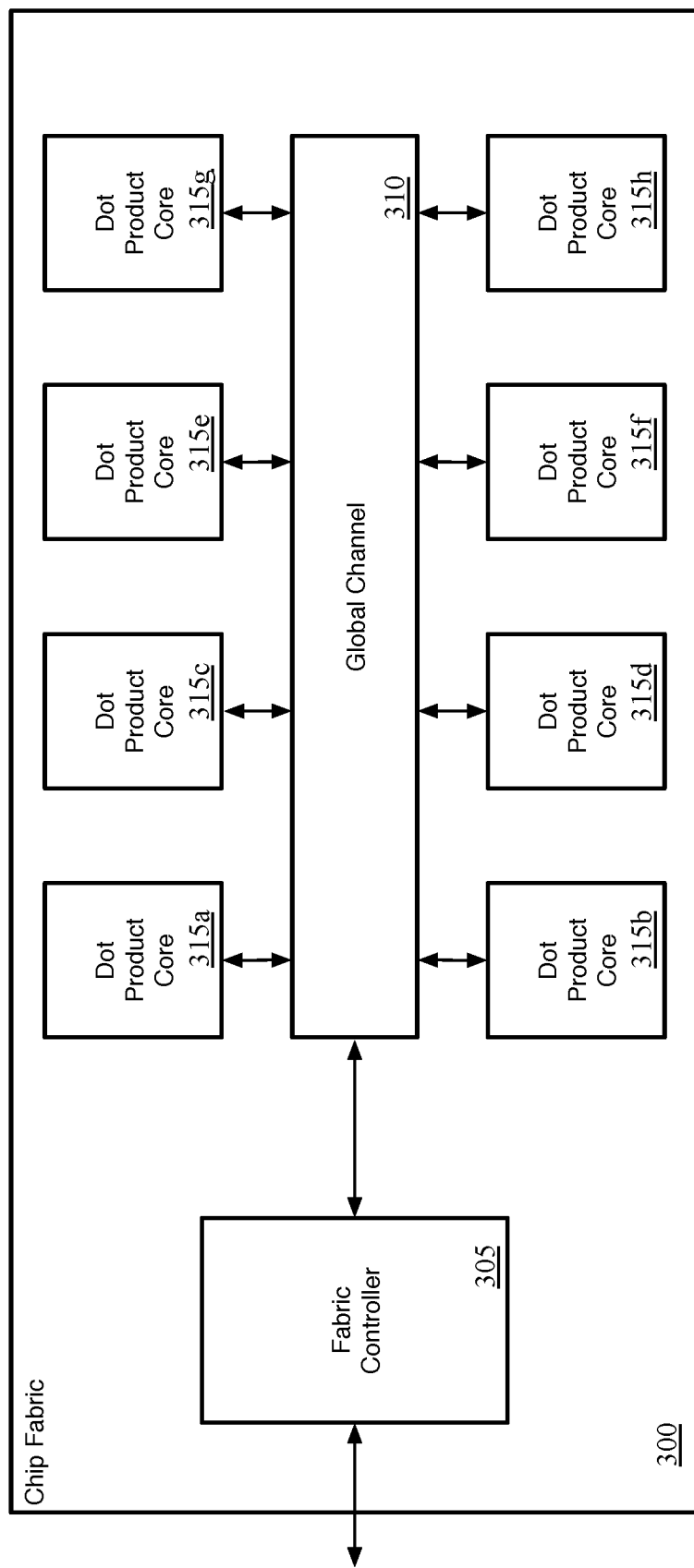
FIG. 3 conceptually illustrates the neural network computation fabric of some embodiments.

FIG. 3 conceptually illustrates the neural network computation fabric 300 (also referred to as the chip fabric) of some embodiments. The chip fabric 300 of some embodiments includes a fabric controller 305, a global channel 310, and a set of dot product cores 315a-h. The connections between the various components 305-315 represent the flow of both control data (e.g., configuration data for a particular neural network layer) and computation data at runtime in some embodiments.

The fabric controller 305 is responsible for managing the operation of the rest of the chip fabric 300 (e.g., the dot product cores 315) in some embodiments. The fabric controller 305 loads instruction arguments (e.g., weight values, previously computed activation values, etc.) from local memory (not shown) on the chip, maps instructions into a sequence of memory-mapped register writes, synchronizes the downstream controllers (e.g., controllers for the various cores 315), etc. The instructions managed by the fabric controller 305 are configured at compile time, in some embodiments, based on the parameters of the network being implemented by the chip fabric 300. In some embodiments, the fabric controller 305 interacts with the microprocessor of the IC as well (i.e., the fabric controller 305 handles the communication with the CPU 210 shown in FIG. 2).

The chip fabric also includes numerous dot product cores 315 as well as a global channel 310 that connects the cores, with these data processing circuits configured by the fabric controller (and a set of hierarchical control circuits, in some embodiments). These data processing circuits 310 and 315 operate to compute neural network operations in an efficient, low-power manner, according to the configuration data provided by the control circuits.

The dot product cores 315a-h include circuitry for computing partial dot products in some embodiments, which is described in further details below. In some embodiments, this circuitry includes memory and/or buffers for storing weights and activations, controllers for reading these values out of memory, and adder trees for computing the partial dot products based on the weight and activation inputs. The adder trees and input circuitry of some embodiments are described below in greater detail, by reference to FIGS. 15 and 16.

The global channel 310 is responsible for providing a communications bus for control and computation data between the fabric controller 305 and the cores 315, as well as from one core to another. The global channel 310, among other operations, accumulates partial dot products from multiple cores when computing dot products that require more computations than can be performed in a single core, and performs post-processing on these dot products. In addition, the global channel 310 carries activations (i.e., computation node outputs) after post-processing for storage (and for use as inputs to subsequent computation nodes) in other cores 315. In some embodiments, the global channel 310 includes an accumulating bus for accumulating the dot products and a non-computation bus for providing activations, weights, and other configuration data to the cores and other computation circuits. In some embodiments, the linear function post-processing and non-linear function for each neural network node are also performed by circuits in the global channel 310.

The chip fabric 300 of some embodiments computes numerous neural network computation nodes simultaneously, with the computation for one node often spread across multiple cores (and subsequently the global channel). In some cases, if a neural network layer is small enough, then computation for that layer may be confined to a single core 315. However, if multiple cores are used for a given layer (any number of cores may be used in some embodiments), then each dot product computed for that layer is spread across all of the cores 315 in use.

That is, for a dot product computed across more than one core 315, each of these cores computes a partial dot product from a subset of the input values and weight values for the node, then provides these partial dot products to the global channel 310. In some embodiments, a set of input values are used as the input to multiple nodes in a layer, so a core simultaneously computes the dot products of these input values with multiple sets of weight values. Similarly, a set of weight values (referred to as a filter, or filter slice when that filter is divided across multiple cores) are used as the weights for numerous nodes with different sets of input values, so in some embodiments the cores load sets of weight values once and then compute dot products of these weight values with numerous different sets of input values.

In the simplest case, all of the partial dot products are computed in the same clock cycle and provided at the same time to the global channel 310. In some cases, however (e.g., for dot products with a very large number of terms), each core 315 computes more than one partial dot product, requiring multiple clock cycles. Based on configuration data specifying which outputs from the cores are to be added together (and whether multiple partial dot products are required from the same core), the global channel 310 aggregates these partial dot products to compute the complete dot product for each node, then applies various post-processing functions (e.g., the bias, scale, and non-linear activation functions) to compute the output of each node.

Figure 4:
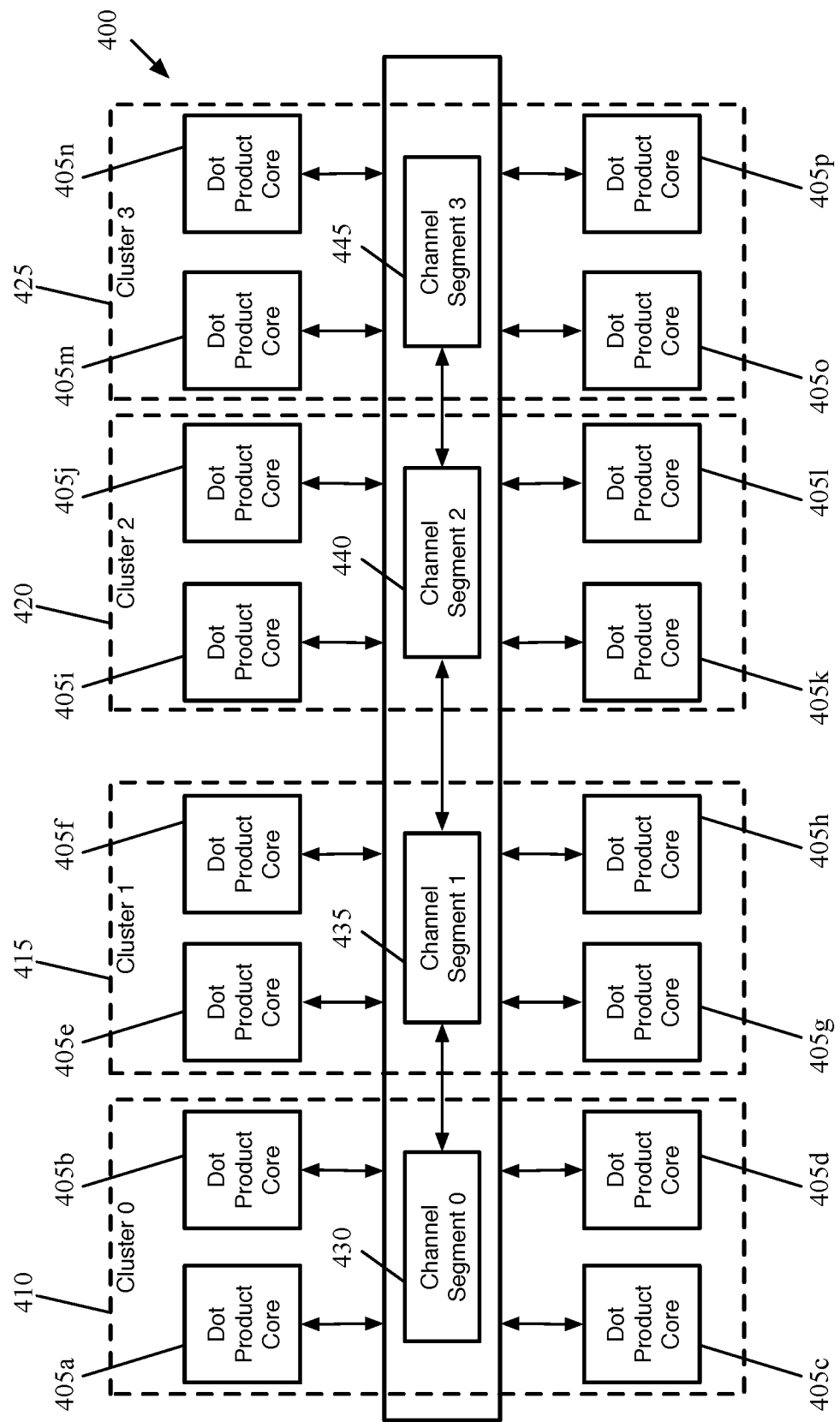
FIG. 4 illustrates a neural network computation fabric of some embodiments with sixteen dot product cores grouped into four clusters.

In some embodiments, the dot product cores are grouped into clusters, and the global channel includes separate segments for each such cluster. FIG. 4 illustrates a neural network computation fabric 400 of some embodiments with sixteen dot product cores 405a-p grouped into four clusters 410-425. In addition, the global channel includes four channel segments 430-445. Each of these channel segments includes the same circuitry in some embodiments, with the exception that buses in the first channel segment 430 and last channel segments 445 only connect to corresponding buses in one other channel segment while the buses in the intermediate channel segments 435 and 440 connect to corresponding buses in two channel segments.

The data processing circuitry of each of the channel segments 430-445 includes a dot product bus, a set of post-processing circuits, and an output bus in some embodiments. The dot product bus receives partial dot products from the cores, aggregates these dot products together, and provides the aggregated dot products to the post-processing circuits. The post-processing circuits perform the non-dot product computations of the neural network computation nodes, which may include a bias (addition) factor, a scaling (multiplication) factor, and a non-linear activation function (e.g., for a node in a convolutional or fully-connected layer). The output of the post-processing circuits are the computation node outputs (activations). The output bus, or activation write bus, carries the outputs of the post-processing circuits to the cores 405a-p to be stored as inputs for the next computation layer.

In some embodiments, each cluster 410-425 or group of clusters (e.g., clusters 410 and 415 being one group and clusters 420 and 425 being a second group) can execute a separate neural network. This allows the fabric to execute multiple networks simultaneously, so long as the networks are not so large as to require more than the cores of the allocated cluster. For instance, a single chip of an TOT device could run both a facial recognition network and an object recognition network, a facial recognition network and a language parsing network, etc.

Figure 5:
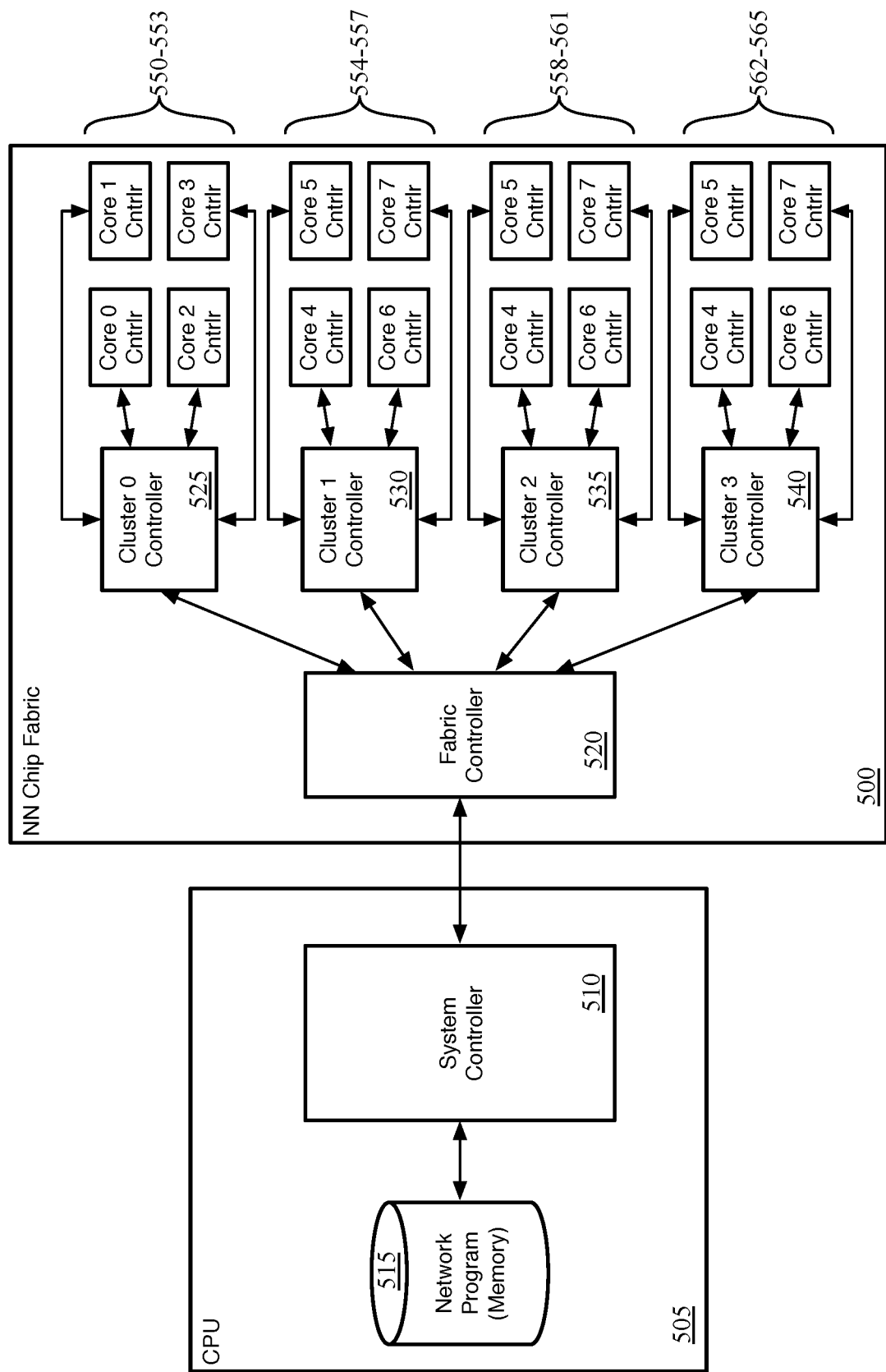
FIG. 5 conceptually illustrates a set of controller circuits for configuring a neural network chip fabric of some embodiments to execute a neural network.

Before describing the structure of the global channel in greater detail, the hierarchical control and configuration of the neural network chip fabric will be described. FIG. 5 conceptually illustrates the set of controller circuits for configuring a neural network chip fabric 500 of some embodiments to execute a neural network. As shown, a CPU 505 executes a system controller 510 and stores a neural network program 515 (i.e., the compiled version of the neural network) in its memory.

The system controller 510 provides the neural network instructions to the chip fabric 500 (per the stored network program 515) for the chip fabric to execute the program on incoming input data (e.g., images, etc.). In some embodiments, the system controller 510 provides these instructions to the chip fabric 500 incrementally. For instance, in some embodiments, the system controller 510 initially loads the instructions for the first layer of the neural network, or a portion of the first layer, then waits for a signal from the chip fabric 500 indicating that these instructions have been completed.

If a layer of the network is small enough to be completed in a single pass, then the compiler of some embodiments schedules the entire layer for one pass. However, as described below, there is a maximum number of filters that can be loaded in a single pass (e.g., 64). In addition, in some embodiments there is a maximum number of output sets that can be written to the same core in the same pass, so this can also constrict the number of filters in a pass. The chip fabric computes the output all of the nodes for each filter loaded (i.e., each pass loads all of the input activations for the layer in the correct order for the outputs to be computed. However, if a layer has more than this maximum number of filters, then the layer will be divided across multiple passes. Once the first portion of the network is completed, the system controller 510 provides the fabric 500 with the instructions for the second portion (e.g., a second layer, or a second pass of the first layer), and so on until the chip fabric has fully executed the network.

The chip fabric 500 includes a hierarchical control structure for configuring the data processing circuitry (i.e., the dot product cores and global channel segments) to execute the neural network instructions from the system controller 510. As shown, the chip fabric 500 of some embodiments includes (i) a fabric controller 520 that interacts with the system controller 510 on the CPU 505, (ii) a set of cluster controllers 525-540, and (iii) a set of core controllers 550-565. Some embodiments include one cluster controller for each cluster of the chip fabric and one core controller for each core (in this case the chip fabric 500 has four clusters with four cores each).

Figure 6:
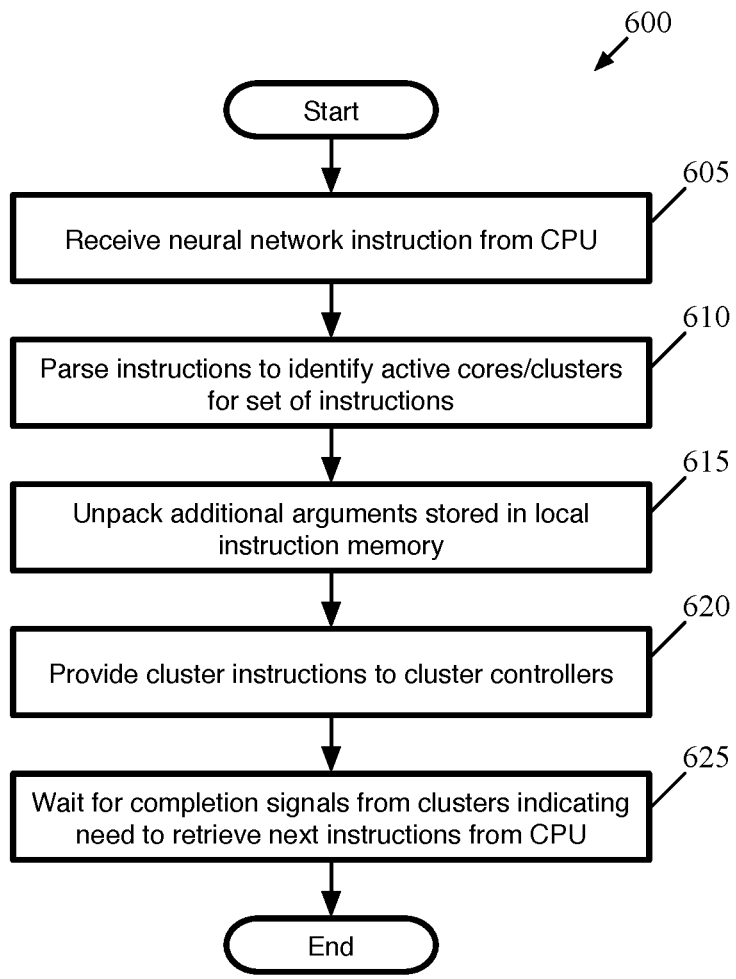
FIG. 6 conceptually illustrates a process of some embodiments for handling neural network instructions from the system controller.

The fabric controller 520 provides the point of interaction with the CPU 505 for the chip fabric 500, receiving neural network program instructions from the system controller 510 and sending signals to the system controller to indicate when instructions have been completed. FIG. 6 conceptually illustrates a process 600 of some embodiments for handling neural network instructions from the system controller. This process 600 is performed by the fabric controller of some embodiments (e.g., the fabric controller 520).

As shown, the process 600 begins by receiving (at 605) a set of neural network instructions from the CPU (i.e., from the system controller executing on the CPU). The process parses (at 610) these instructions to identify the active cores (and thus the active clusters) for the set of instructions, and also unpacks (at 615) additional arguments stored in local instruction memory on the chip fabric. In some embodiments, in order to minimize power usage, the instructions provided from the CPU are high-level commands that the fabric controller parses in order to determine more detailed instructions for the lower-level controllers. Doing so limits control signal power consumption on the chip while encapsulating implementation details of the lower-level (cluster, core) circuits.

For example, in some embodiments the instructions from the system controller 510 to the fabric controller 520 specify to execute a particular pass of a particular layer of the network, and the fabric controller memory includes the required information to execute this specific pass. In some embodiments, this information is conveyed by the system controller instructions specifying to execute a particular type of pass or layer (e.g., convolution) based on the arguments found at a particular memory location of the fabric controller's memory. The specified memory location stores arguments such as the source cores for the computations (i.e., the cores that will perform the dot product calculations) and the destination cores for the output values (i.e., the cores to which the output values are stored), the memory locations in the cores at which to find the weight and/or input values for the computations (in some embodiments, the weight values are loaded into memory initially such that these memory locations are the same across all of the source cores), information for calculating the non-linear activation function for the layer (e.g., the lookup table mapping information), etc.

Because layers may potentially include thousands of output activation values, having the CPU specify a core and RAM location for each such activation value would require a lot of power. Instead, as described, some embodiments specify only a few parameters required for the chip fabric to determine the memory locations for each activation value (e.g., the cores at which the values will be stored, the starting memory address that is the same for each core, and the dimensions of the activation layer). In addition, similar principles apply to the use of input values already stored in RAM (the outputs of the previous layer) for the dot products of the current layer. The weight values and their location in memory, the location of the input values, the lookup table configuration for a layer, etc. are all the same for each network input (e.g., each frame of video) as the network is statically scheduled, so resources can be saved by storing all of this information on the chip at bootup, with a minimal amount of instruction information sent from the CPU for each layer or pass (i.e., only the location in the fabric controller of the arguments for the current layer).

Next, the process 600 provides (at 620) cluster instructions to the cluster controllers for the identified clusters that are in use for the current neural network layer. Avoiding use of some of the clusters when possible provides power savings, as these cores can be powered down, or at least the memories in the cores put to sleep. Even for networks that require the use of all of the cores of the chip fabric, often the initial layers have smaller dot product computations that require fewer cores. In addition, in some embodiments, the fabric controller synchronizes the cluster controllers, ensuring that dot products computed across multiple clusters are aggregated together correctly.

In some embodiments, the cluster instructions provided by the fabric controller are not fully parsed instructions, pushing some of this work to the cluster and/or core controllers. For instance, the fabric controller may only provide the starting memory address for the activations and the activation layer dimensions, allowing the cluster controllers to determine at which core (and the RAM location within that core) each activation value is to be stored. The fabric controller also broadcasts these instructions in some embodiments, while including certain bits that specify the difference in setup between the clusters (or whether certain clusters even need to act on the instructions). Some embodiments broadcast the instructions only to the clusters involved in the computation (which could include clusters with source cores, destination cores, or both). This broadcasting reduces latency and power consumption as compared to sending separate sets of instructions to each cluster.

Finally, the process 600 waits for completion signals from the clusters indicating that the current set of instructions has been executed and therefore that the fabric controller needs to retrieve the next set of instructions from the system controller on the CPU. Once the fabric controller receives completion signals from all of the clusters that are involved in executing the current neural network layer, the fabric controller notifies the system controller that the instructions have been executed, so that the system controller provides the next set of high-level network instructions to the fabric controller on the chip fabric.

Returning to FIG. 5, each of the cluster controllers 525-540 receives instructions from the fabric controller and configures its own segment of the global channel in addition to parsing the instructions to identify configuration data for each of the cores in its cluster. That is, each cluster controller 525-540 that receives cluster instructions for a given high-level instruction directly configures the dot product bus, the post-processing units, and the activation write bus in its channel segment. In addition, these cluster controllers 525-540 determines which of its cores require the instructions and provides these instructions to the core controllers for these identified cores.

Much as the fabric controller 520 parses the high-level instructions from the system controller 510, the cluster controllers 525-540 of some embodiments decompose the instructions from the fabric controller 520 to determine the configuration data to provide to its channel segment circuits (dot product bus, post-processing units, and activation write bus) as well as the sets of instructions for each of its cores. The cluster controllers configure the channel segment circuits to, e.g., aggregate the partial dot products from the cores correctly (both within a channel segment and across channel segments), provide these aggregated dot products to the post-processing units in the correct channel segment, perform post-processing operations, and provide the output of the post-processors to the correct core. In some embodiments, this information both comes from the fabric controller (e.g., the lookup table mapping for the non-linear activation function) as well as from information stored in cluster controller memory.

The use of separate cluster controllers enables the ability of the chip fabric to execute multiple separate networks simultaneously in some embodiments. The fabric controller 520 can provide instructions to the first cluster controller 525 for a layer of a first neural network and, so long as those instructions do not require the use of other clusters, the first cluster can execute the entire neural network layer in a self-contained manner. At the same time, the fabric controller 520 could provide instructions to the second cluster controller 530 for a layer of a second neural network, with the second cluster executing the entire neural network layer in a self-contained manner. The third and fourth cluster controllers 535 and 540 could receive instructions for third and fourth networks as well, to execute at the same time as the first two. In addition, other combinations of clusters can execute multiple networks simultaneously (e.g., the first two clusters executing a first network and the second two clusters executing a second network, the first two clusters executing a first network while the third and fourth clusters each separately execute second and third networks, etc.

The cluster controllers 525-540, as mentioned, also provide the appropriate configuration data to each of the core controllers 550-565, which coordinate the dot product processing in the core (as well as the direct delivery of input activation values to the global channel for pooling, element-wise operations, etc.). In some embodiments, the cluster controllers do not fully parse the instructions to specify each individual memory read or write, but instead provide the higher-level instructions to each core controller. In addition, some embodiments broadcast the instructions from a particular cluster controller to each of the core controllers within the cluster (or the core controllers for each of the cores active in the current pass), while including certain bits that specify the difference in setup between the cores. This broadcasting reduces latency and power consumption as compared to sending separate sets of instructions to each core.

The core controllers 550-565 then parse these instructions to determine the specific configuration data for the operations of the core. This configuration data includes memory locations for various read operations to read and align weight and activation values, enable bits for the dot product operations, memory locations for write operations after activations have been computed, etc. Once the instructions are fully executed, the core controllers 550-565 send completion signals to the cluster controllers 525-540. Similarly, once the cluster controllers 525-540 receive these completion messages, they send similar messages to the fabric controller 520, which can then notify the system controller executing on the CPU that the instructions are complete.

Figure 7:
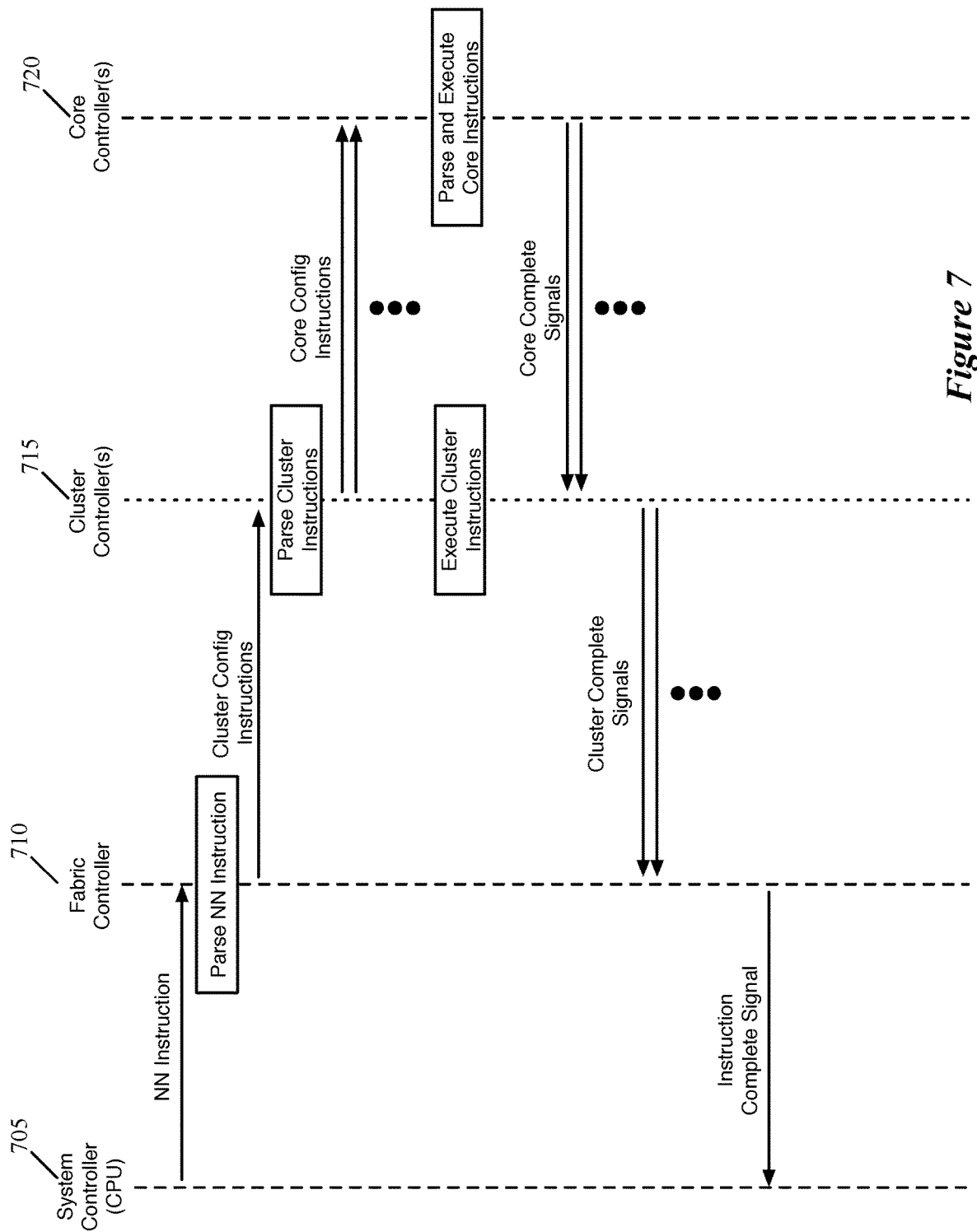
FIG. 7 conceptually illustrates the high-level interactions between the controller circuits (and the system controller executing on the CPU) to execute a set of neural network instructions according to some embodiments.

FIG. 7 conceptually illustrates the high-level interactions between the controller circuits (and the system controller executing on the CPU) to execute a set of neural network instructions (e.g., for a layer of a neural network) according to some embodiments. Specifically, this diagram shows the interactions between the system controller 705, fabric controller 710, cluster controllers 715, and core controllers 720. In some embodiments, the system controller 705 is a program that executes on the CPU, while the fabric controller 710, cluster controllers 715, and core controllers 720 are circuit blocks on the neural network computation fabric.

As shown, the system controller 705 initially sends a set of neural network instructions to the fabric controller 710 (e.g., instructions for a neural network layer or portion thereof). The fabric controller 710 parses these instructions and unpacks data in local memory to generate cluster configuration instructions, which the fabric controller sends to the cluster controllers 715. In some embodiments, the fabric controller broadcasts these instructions to all of the cluster controllers (or cluster controllers for all cores involved in the pass), with data specifying differences between the configuration data for the different clusters.

The cluster controllers 715 parse these cluster instructions to generate configuration data for the channel segment circuits, as well as to generate configuration instructions for the cores. Each cluster controller that is instructed to provide data to its cores broadcasts these configuration instructions to all of its core controllers (or the core controllers for all cores involved in the current pass) in some embodiments, whether those core controllers require instructions or not, with data specifying differences between the configuration data for the different cores.

The core controllers 720 parse and execute these instructions, performing the requisite read operations, dot product computations, and write operations. When the instructions have been fully executed by a given core controller 720, that core controller sends a signal to its cluster controller indicating that the instruction is complete. The cluster controllers execute the cluster instructions (e.g., configuring the global channel segment to perform the requisite dot product aggregation, post-processing, and activation transport operations). After both executing these instructions and receiving the completion signals from each of their cores, the cluster controllers 715 send completion signals to the fabric controller. In this figure, the execution of the cluster instructions and the execution of the core instructions are shown as occurring at the same time, as in some embodiments the execution in the cores and the channel segment overlaps. In other embodiments, however, the cluster controllers 715 do not execute their instructions until receiving completion signals from the core controllers 720.

The fabric controller 710 sends a completion signal to the system controller 705 on the CPU once all of the relevant clusters have indicated that they have completed the current instruction set. Upon receiving this, the system controller provides the next set of instructions to the fabric controller, and the process shown in FIG. 7 starts again. In some embodiments, the last set of neural network instructions is a set of memory read operations, for the computation fabric to deliver the neural network output results to the system controller for any post-processing operations (e.g., a softmax operation to generate a probability, etc.). After this, the system controller puts the fabric to sleep until the next set of input data is to be processed, in some embodiments.

Figure 8:
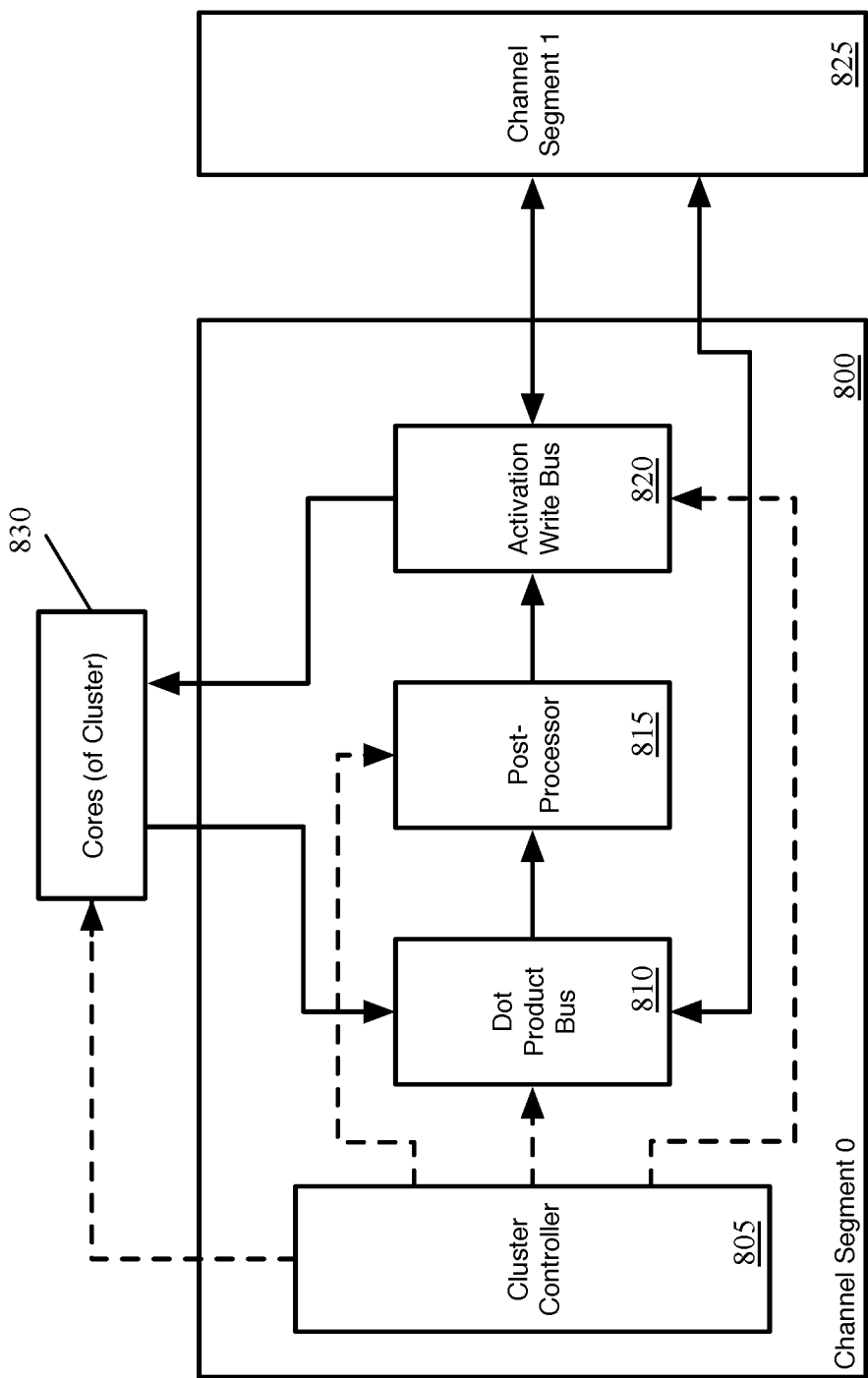
FIG. 8 conceptually illustrates the circuit blocks of a channel segment of some embodiments.

Returning to the neural network computation circuitry, FIG. 8 conceptually illustrates the circuit blocks of a channel segment 800 of some embodiments (e.g., one of the channel segments 430-445 shown in FIG. 4). The channel segment 800 includes a cluster controller 805, a dot product bus 810, a post-processor 815, and an activation write bus 820 (also referred to as an output bus). In addition to the channel segment 800, the figure also illustrates an additional channel segment 825 and the cores 830 of the local cluster for the channel segment 800, as the circuit blocks of the channel segment 800 exchange dot product and configuration data with these other circuits. In this diagram, the dashed lines represent the flow of configuration data while the solid lines represent the flow of neural network computation node data for convolution or fully-connected layer nodes (i.e., nodes that use a dot product based linear function). Additional neural network computation data, such as that flowing directly from the cores 830 to the post-processor 815 for pooling nodes or element-wise operators, is not shown.

The cluster controller 805 configures the dot product bus 810, post-processor 815, and activation write bus 820 as per the configuration instructions received from the fabric controller in some embodiments. For the dot product bus 810, this configuration data specifies, in some embodiments, (i) which partial dot products are to be added together as part of the same neural network computation node and (ii) to which post-processing unit each aggregated dot product is sent (the post-processor 815 of some embodiments includes numerous post-processing units with the same circuitry). In other embodiments, the post-processing unit that receives each aggregated dot product is not specified as configuration data because there are an equal number of dot product bus lanes and post-processing units, so that the data from each lane is provided as the primary input to a different post-processing unit.

For the post-processor 815, the configuration data of some embodiments indicates (for each of the post-processing units) whether a dot product computation node or other computation node (e.g., pooling, element-wise operator) is being executed, the scaler and bias factors for a linear computation, the activation function to use (which may be specified, e.g., as a lookup table), as well as other data. For the activation write bus 820, the configuration data indicates to which cores each output value is to be delivered, in some embodiments. The operation of each of these circuit blocks 810-820 is discussed in greater detail below.

As mentioned, the solid lines indicate the flow of neural network computation data, for a node in a convolutional or fully-connected layer. The cores 830 (as well as, in some cases, cores of other clusters) compute partial dot products. For a given computation node, these partial dot products may be computed across multiple cores. In some embodiments, if more than one core is used to compute the dot products for a neural network layer, then the partial dot products for each node are computed across all of these cores.

These partial dot products are output to the dot product bus 810, which aggregates the partial dot products from the cores 830 of the local cluster. The dot product bus spans all of the channel segments, and the dot product bus in each channel segment aggregates the partial dot products from the cores of its local cluster. The dot product bus 810 in the channel segment 800 also exchanges locally-aggregated dot products with its neighboring segments for further aggregation if needed. In this case, the channel segment 800 only has one neighboring segment, but internal channel segments (e.g., the segments 435 and 440 in FIG. 4) will have two such neighboring segments. The configuration data from the cluster controller 805 specifies whether to send these dot products in one direction or the other along the global channel, or to aggregate the dot products from the neighboring channels locally, depending on where post-processing will occur for each dot product.

The post-processor 815 includes numerous post-processing units that receive the dot products from the dot product bus and perform the non-dot product functions of the neural network computation nodes. For a typical computation node of a convolutional (or fully-connected) layer, these functions includes an addition operation to account for the bias factor, a multiplication operation to account for the scaling factor, and a non-linear activation function. In some embodiments, the outputs of the linear function are quantized or truncated to a particular number of bits (e.g., 4 bits, 5 bits, 8 bits). Using a small, fixed number of bits for the outputs of each computation node allows for (i) power and resource savings by enabling smaller computations and (ii) certainty in the scheduling of computations (i.e., by knowing that all input values will be within a particular range) that enables further power and resource savings in design. The non-linear activation function, in some embodiments, is implemented as a lookup table rather than a hardwired function. This enables the IC to execute different neural networks that use different activation functions and, in some embodiments, allows for different activation functions to be used in different layers of the neural network.

The activation write bus 820 receives the computation node activation outputs from the post-processing units and carries these outputs back to the cores 830, to be stored in the memory of the core and used as inputs for the computation nodes of the next layer of the neural network. The activation write bus connects to the cores 830 in the local cluster as well as the activation write bus in the neighboring channel segment 825. As with the dot product bus 810, the activation write bus 820 of some embodiments includes lanes, with each post-processing unit of the post-processor 815 sending its output to a different one of these lanes.

In some embodiments, the output values may be computed by the post-processor 815 in one cluster but carried by the activation write bus 820 to a core in another cluster to be stored. For efficiency, the compiler of some embodiments (a software program that generates the configuration data for enabling the IC to execute a particular neural network) attempts to optimize the location of the post-processing unit for each computation node output relative to the cores used to compute the constituent partial dot products for that computation node and the destination core for the output value. The activation write bus 820 also includes a right shift circuit for each core that is used to align the output values for the core, in order for the values to be stored in contiguous blocks within the core RAM.

Figure 9:
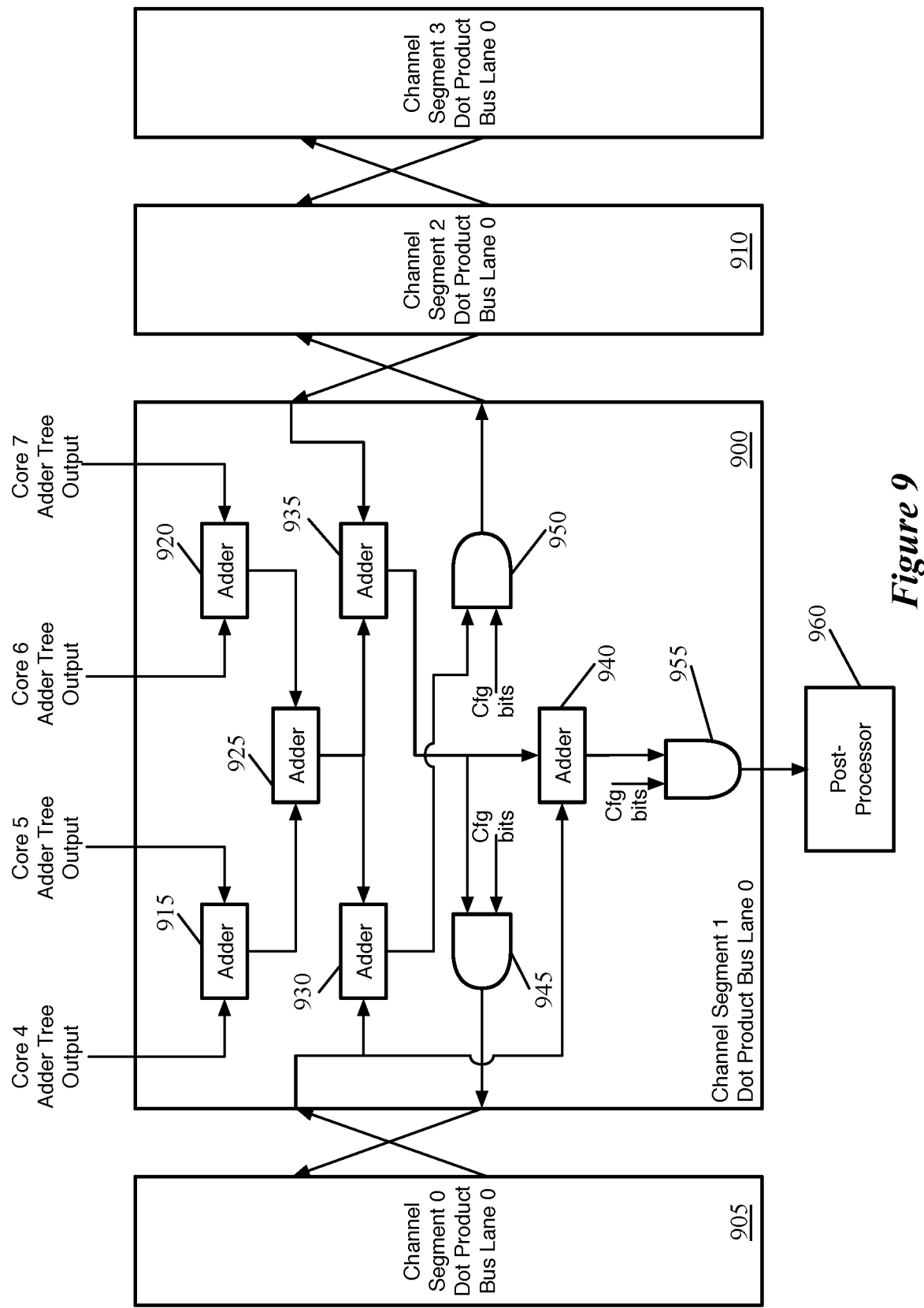
FIG. 9 conceptually illustrates a portion of the dot product bus of some embodiments.

Now that the primary circuit blocks of the global channel have been introduced, these circuits of some embodiments will be explained in greater detail. FIG. 9 conceptually illustrates a portion 900 of a dot product bus of some embodiments. In this example, the segment for which the dot product bus portion 900 is shown is an internal segment (in that it has two neighboring segments 905 and 910). The dot product bus of some embodiments includes, within each segment, numerous (N) non-interacting lanes, and the portion 900 is a segment of one of these lanes. In some embodiments, each segment includes the same number of lanes, and lane n E N in one segment is connected to lane n in its neighboring segments for the aggregation of dot products across clusters. In some embodiments, the number N of dot product bus lanes is equal to the number of adder trees computing partial dot products in each core, the number of post-processing units in each post-processor block of a channel segment, and the number of activation write bus lanes. Thus, each computation node has its partial dot product computed by the same adder tree in each of one or more cores, which is aggregated across the corresponding dot product bus lane to calculate the complete dot product. This complete dot product is (in the typical case) provided to the corresponding dot post-processing unit, which provides its output to the corresponding activation write bus lane to be carried to the appropriate core.

The dot product bus portion 900 includes a set of adders 915-940 as well as a set of AND gates 945-955. The first three adders 915-925 form an adder tree to aggregate the partial dot products output by the corresponding adder trees of the four cores of the local cluster for the channel segment. In some embodiments, if a core does not compute a partial dot product for a particular computation node, then that core outputs a 0 value to the dot product bus. This aggregated partial dot product is output to both of the adders 930 and 935.

These adders 930 and 935 handle the computation of dot products that are "moving" downstream (to a lower-numbered segment, in this case segment 905) and downstream (to a lower-numbered segment, in this case segment 910). The adder 930 receives the aggregated dot product from the corresponding downstream dot product bus lane 905 and combines it with the locally aggregated dot product from the adder 925. If either (i) the cores of the downstream cluster(s) do not participate in the dot product computation or (ii) the dot product will be completely aggregated and sent to a post-processor downstream, then this value received from the downstream dot product bus lane 905 is gated to 0 (i.e., by the equivalent of AND gate 950 in the downstream segment).

Correspondingly, the adder 935 receives the aggregated dot product from the corresponding upstream dot product bus lane 910 and combines it with the locally aggregated dot product from the adder 925. If either (i) the cores of the upstream cluster(s) do not participate in the dot product computation or (ii) the dot product will be completely aggregated and sent to a post-processor upstream, then this value received from the upstream dot product bus lane 910 is gated to 0 (i.e., by the equivalent of AND gate 945 in the upstream segment).

The output of the adder 930 is sent to the AND gate 950, which ANDS this output with configuration bits from the local cluster controller based on where the post-processing for the completed dot product will be performed. If the post-processing segment is upstream, then these configuration bits are 1 (resulting in the aggregated dot product being passed upstream), whereas if the post-processing segment is either downstream or local, then these configuration bits are 0 (resulting in 0 values being passed upstream).

Similarly, the output of the adder 935 is sent to the AND gate 945, which ANDs this output with configuration bits from the local cluster controller based on where the post-processing for the completed dot product will be performed. If the post-processing segment is downstream, then these configuration bits are 1 (resulting in the aggregated dot product being passed downstream), whereas if the post-processing segment is either upstream or local, then these configuration bits are 0 (resulting in 0 values being passed downstream).

The final adder 940 receives (i) the output of the adder 935 and (ii) the aggregated dot product from the downstream segment 905 of the dot product bus lane. It should be noted that the directions could be reversed in other embodiments with an equivalent effect, with this adder 940 instead receiving the output of the adder 930 and the aggregated dot product from the upstream segment 910 of the dot product bus lane. This adder aggregates the complete dot product (accounting for the partial dot products from the local cores and upstream cores via the output of adder 935 and the partial dot products from the downstream cores via the output from the segment 905).

The output of the final adder 940 is provided to the post-processor 960 (e.g., to the post-processing unit that corresponds to the lane of the dot product bus). However, AND gate 955 is used to gate this output to 0 if the post-processor for this dot product bus lane is not local (i.e., either upstream or downstream). In summary, the dot product bus lane segment 900 is configured (via the AND gates 945-955) to (i) add the local cluster partial product with the downstream partial product and pass this aggregated partial product upstream if the post-processing segment is upstream, (ii) add the local cluster partial product with the upstream partial product and pass this aggregated partial product downstream if the post-processing segment is downstream, and (iii) add the local cluster partial product with the downstream and upstream partial products and pass this completed dot product to the local post-processor if the post-processing will be performed locally. In some embodiments, the post-processing segment is selected by the compiler, with the primary factor in this selection being that the post-processing segment is centrally located among the source clusters (i.e., the cores that compute the partial dot products and a secondary factor being that the selected segment is as close to the destination core(s) as possible, in order to reduce the power required for the computation and write operations.

In addition to the circuitry shown in FIG. 9, the dot product bus also includes a control block in some embodiments. This block is responsible for outputting a signal to the post-processor block to indicate when the output of the dot product bus is valid (i.e., when the dot products are aggregated by the dot product bus), so that the post-processor acts on the data from the dot product bus.

Figure 10:
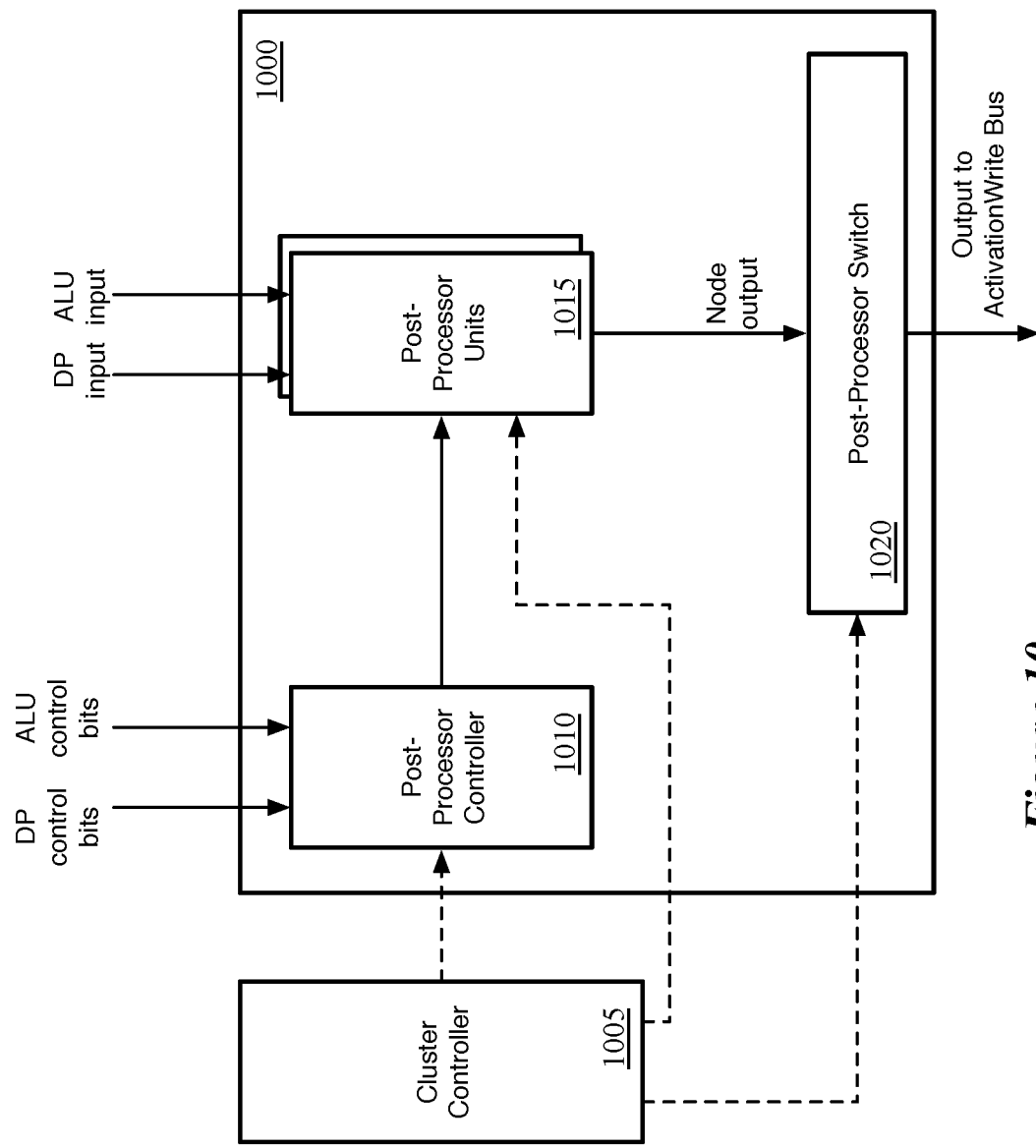
FIG. 10 conceptually illustrates the post-processing circuit block for a channel segment of some embodiments, along with the local cluster controller that provides configuration data to this post-processor.

FIG. 10 conceptually illustrates the post-processing circuit block 1000 for a channel segment of some embodiments, along with the local cluster controller 1005 that provides configuration data to this post-processor 1000. As shown, the post-processing circuit block 1000 includes as sub-blocks a post-processor controller 1010, a set of post-processing units 1015, and a post-processor switch 1020. The cluster controller 1005 provides configuration data to each of these sub-blocks in order to synchronize operations, and to configure the post-processing units 1015 with the correct bias and scale factors as well as the activation function.

The post-processor controller block 1010 aggregates control signals from the dot product bus (for convolution and fully-connected operations) as well as the ALU bus from the cores (for pooling, copy, and element-wise operations). These control bits include accumulate and valid signals for the dot product bus (which indicate to the post-processor whether the incoming data is final dot product, as dot products are not sent every clock cycle) as well as accumulate, valid, and end of row signals for the ALU bus. The ALU bus, as mentioned, carries activation values directly from the cores without having dot products performed, to be used for pooling and element-wise operation layers. The accumulate and valid signals indicate to the post-processor whether the incoming ALU data is to be used, while the end of row signals that different configuration data should be used for certain post-processing operations when the end of a row of input values is reached (e.g., on account of padding, etc.). The post-processor controller block 1010 aggregates these signals, as mentioned, and outputs signals to the post-processing units 1015 to indicate when the post-processing units are receiving valid dot product or ALU data.

The post-processor 1000 includes numerous post-processing units 1015 that handle the non-dot product computation of the neural network nodes. In some embodiments, the post-processor block within a segment includes the same number of post-processing units 1015 as there are dot product bus lanes and activation write bus lanes (which is also the number of adder trees in each core for computing partial dot products). Each post-processing unit 1015 receives two types of data inputs: (1) dot products from the dot product bus for convolution and fully-connected neural network nodes and (2) activation inputs (ALU inputs) from the core RAM for pooling nodes and element-wise operator nodes.

In some embodiments, each post-processing unit receives a single dot product input, from its corresponding segment in the dot product bus. However, to accommodate certain situations in which one or more filter slices assigned to a core is not sparse enough (i.e., too many of the weight values of a portion of the filter used to compute a partial dot product are nonzero), the post-processing units of some embodiments each receive two dot product inputs. Specifically, some of the dot product bus lane outputs are sent to two or more of the post-processing units (in some such embodiments, different dot product bus lane outputs are sent to different numbers of post-processing units, with each post-processing unit receiving two such outputs). Details of the post-processing units are described further below by reference to FIGS. 11-14.

The post-processing switch 1020 of some embodiments compresses the post-processing unit outputs (i.e., the activation outputs) to be sent to the activation write bus. In some embodiments, the chip fabric can be configured for different size activation outputs (e.g., 4-bit, 8-bit, or 16-bit), but the activation write bus requires the outputs to be in contiguous blocks. As such, for output sizes smaller than the maximum, the post-processing switch compresses these together to eliminate the meaningless bits (e.g., compressing four 4-bit activation outputs onto the wires for one 16-bit activation output).

Figure 11:
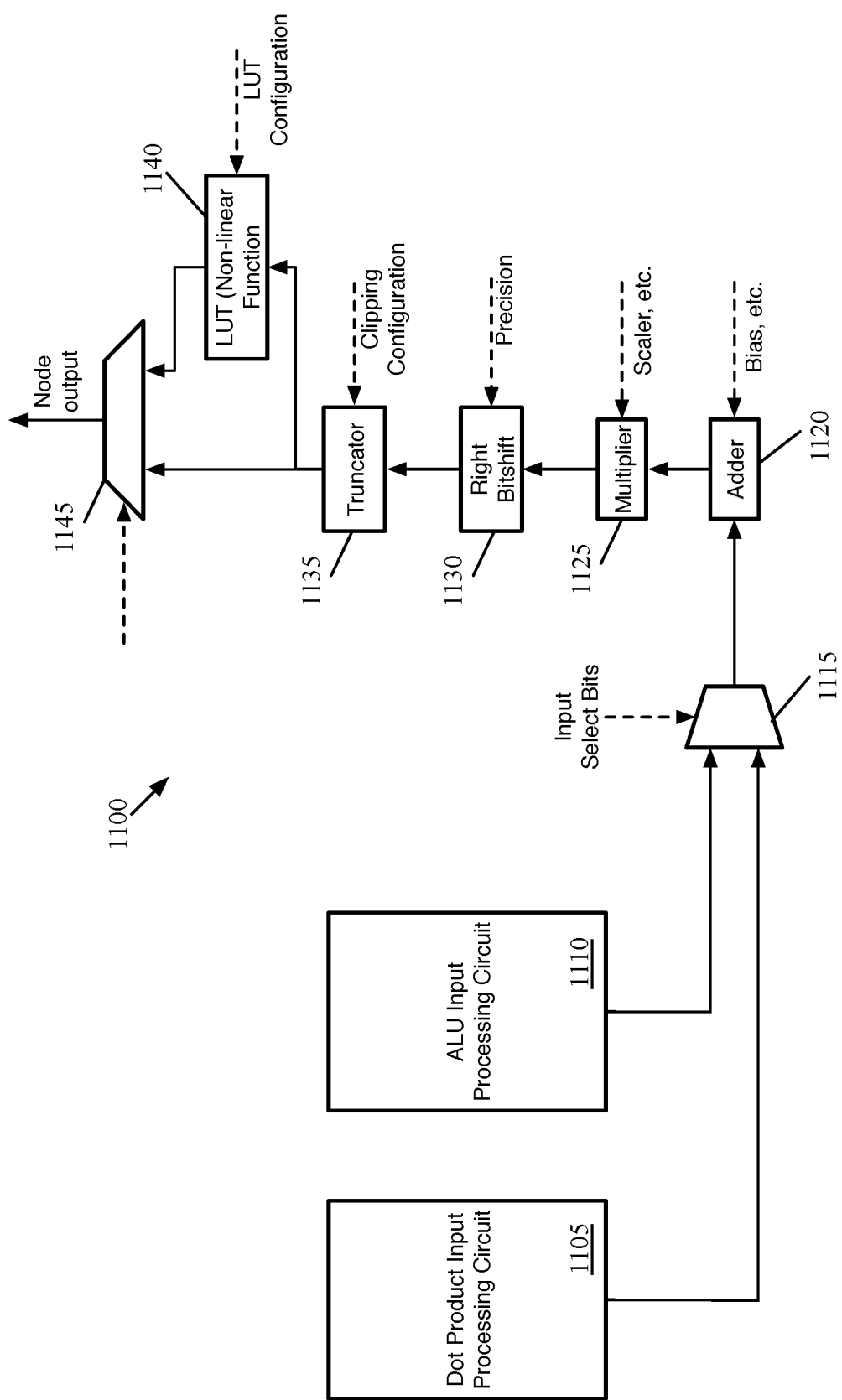
FIG. 11 conceptually illustrates the structure of a post-processing unit of some embodiments.

As mentioned, FIGS. 11-14 illustrate the post-processing units in more detail. FIG. 11 conceptually illustrates the structure of a post-processing unit 1100 of some embodiments. As shown, the post-processing unit 1100 includes a dot product input processing circuit 1105, an ALU input processing circuit 1110, a multiplexer 1115 that selects between the outputs of these two circuits, and a set of post-processing operation circuits.

Figure 13:
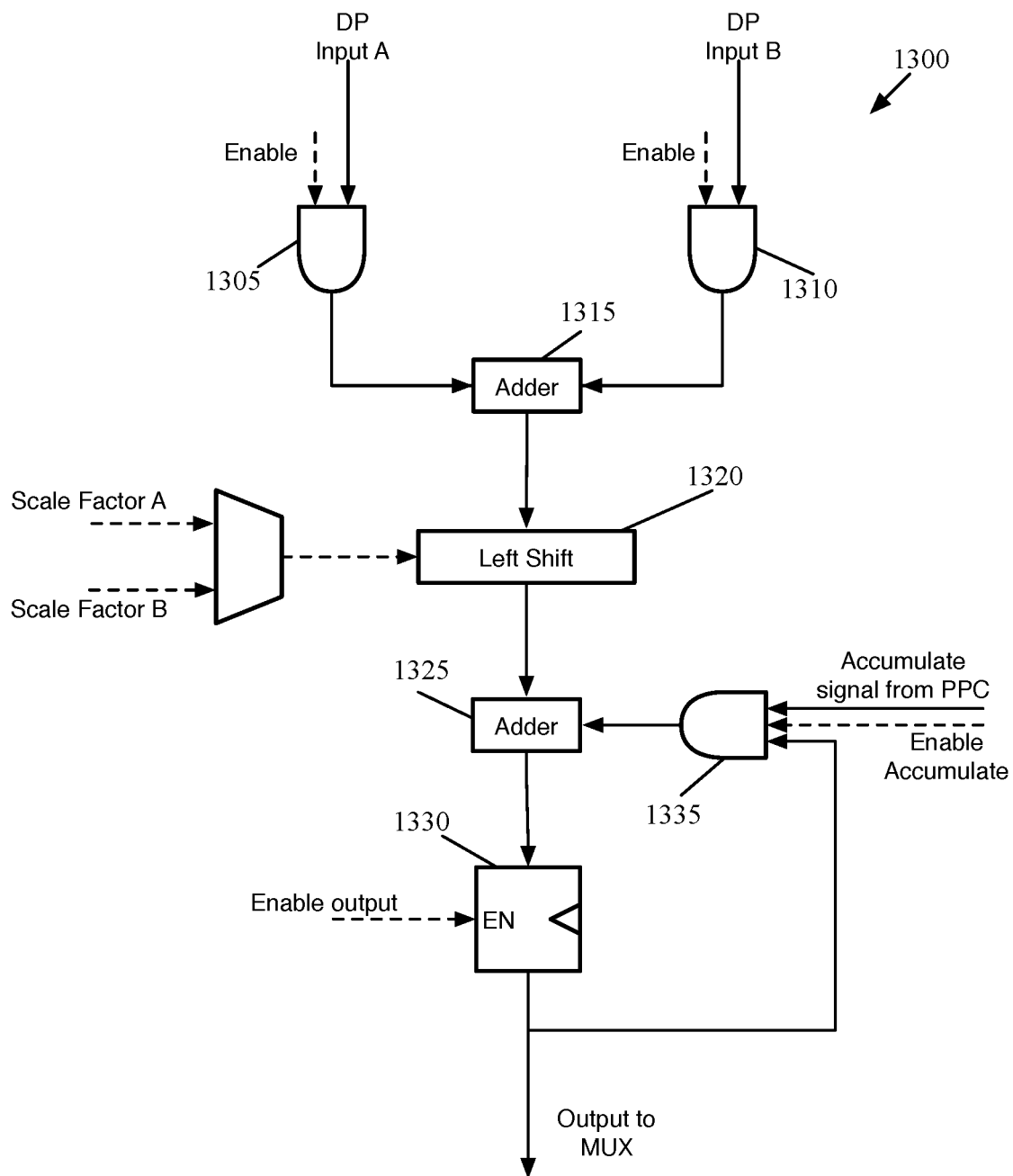
FIG. 13 conceptually illustrates a dot product input processing circuit of some embodiments.

The dot product input processing circuit 1105, described in further detail by reference to FIG. 13, is used to combine dot products from two separate cycles if a dot product is too large to be computed in a single cycle across the cores of the computation fabric. In addition, if a particular filter slice needs to be split across multiple cores (because of too many non-zero weight values), the dot product input processing circuit is configured to account for that (in part by using inputs from multiple dot product buses, as described above). Furthermore, some embodiments enable dot products to be double the size of the standard quantized output (e.g., 8-bit rather than 4-bit) by using dot products from multiple cycles and bit-shifting the first set of input data.

Figure 14:
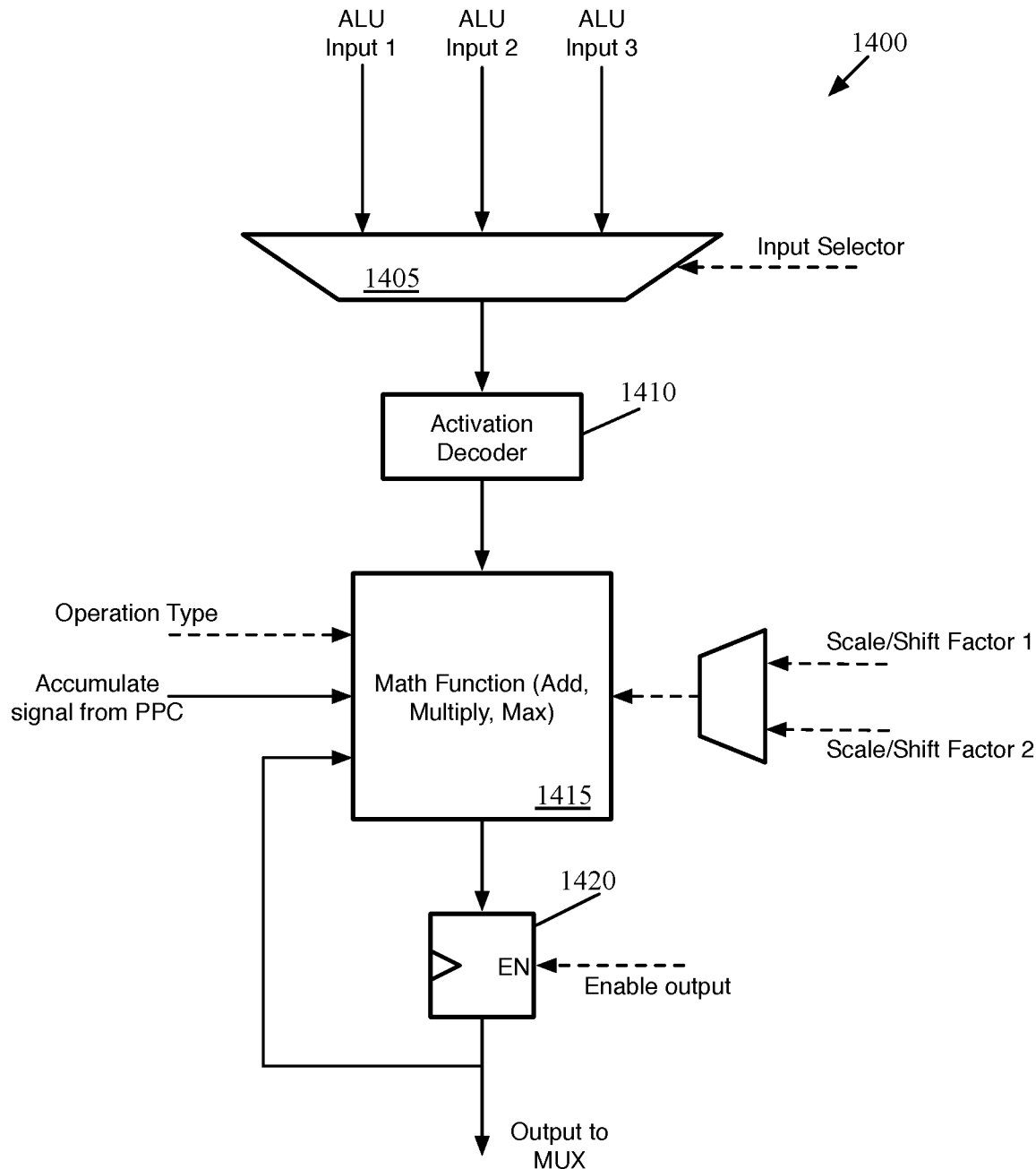
FIG. 14 conceptually illustrates an ALU input processing circuit of some embodiments.

The ALU input processing circuit 1110, described in further detail by reference to FIG. 14, is used to perform operations for neural network nodes that do not use dot products (i.e., that are not part of convolutional or fully-connected layers). Neural network computation nodes that do not use dot products include, for example, pooling layers of convolutional networks (e.g., average pooling and max pooling layers) as well as nodes that perform element-wise operations. In some of these embodiments, the cores provide input values directly to the post-processing units without computing dot products, and the post-processing units are configured to perform the appropriate operations on these inputs.

The output of each of these circuits 1105 and 1110 is sent to a multiplexer 1115, and a set of configuration bits is used to select between these two possible inputs. This input value is sent to an adder 1120 and then to a multiplier 1125. For dot product outputs, the adder 1120 adds the bias of the linear function for the node and the multiplier 1125 multiplies this by the scaling factor for the linear function. The bias value sent to the adder 1120, in some embodiments, is a combination of (i) the bias value computed during the training of the neural network and (ii) a number of negative weight values. As described in more detail below and in U.S. patent application Ser. No. 16/120,387, filed Sep. 3, 2018, now issued as U.S. Pat. No. 10,740,434, which is incorporated herein by reference, in some embodiments the weight values are ternary in each layer (i.e., either 0, a positive value, or a negation of that positive value). The partial dot product calculation in the cores treats these ternary weights as {0, 1, and −1}, and uses a ternary MAC circuit that performs one's complement addition to account for negative weights. The bias factor in the configuration data then accounts for the number of negative weights, to effectively turn the one's complement addition into two's complement addition. Furthermore, for larger input and output values (e.g., 8-bit input and output values), in which the dot product input processing circuit 1105 left shifts the dot product of the most significant bits of the inputs (e.g., by 4 bits), the bias factor has to add a larger amount for the negative weights. For the 8-bit case (in which the dot product of the weights with the most significant nibble of the inputs is shifted by 4 bits), the bias factor adds 17 for each negative weight. The value sent to the multiplier 1125, in some embodiments, is a combination of (i) the scaler value computed during the training of the neural network (which is often 1) and (ii) the positive value of the ternary weight (which was removed in order to scale the weight values used in the dot product to 1 and −1).

In some embodiments, a multiplexer is used to select between a bias value specific to the post-processing unit (i.e., allowing for different bias values for different computation nodes in a layer) and a bias value shared across all of the post-processing units in a layer. In general, convolution and fully-connected nodes will use a node-specific bias value (especially when accounting for the number of negative weights), but pooling and element-wise operator layers may use the same value for all of the nodes (often zero). For the scaling factor, a set of multiplexers is used in some embodiments to select between a node-specific scaling value and two possible shared scaling values. In some embodiments, pooling layers will use the same shared scaling value for each node (e.g., to divide by the number of nodes over which average pooling is performed), but at the end of a row will need a different scaling value to account for padding.

The right bit shift operator 1130 ensures that, post-multiplication, the value has the desired precision (i.e., shifting the binary point). As an example, a number with three bits before the binary point and two bits after multiplied by a similar such number would result in a number with six bits before the binary point and four bits after. However, if a number with only two bits after the binary point is desired, the right bit shift removes the last two bits. In some embodiments, the right bit shift receives a set of configuration bits that map to different allowed precisions.

The truncator 1135 performs a clipping operation in some embodiments to truncate the output value of the linear operator down to the desired number of bits. In some embodiments, this can be a 4-bit value, a 5-bit value (a 4-bit signed value), an 8-bit value, or a 16-bit value. In such embodiments, the output has 16 wires, and values of less than 16-bits have 0s for the appropriate number of most significant bits. In other embodiments, the maximum output is 8 bits, in which case 4-bit, 5-bit, and 8-bit values are possible outputs. Different clipping operations that may be used, in different embodiments, can include a modulo operation (that effectively zeroes out a particular number of the most significant bits), clipping values above a maximum down to that maximum (e.g., if outputting a 5-bit value, all values above 15 are clipped down to 15 (1111), etc. In some embodiments, the truncator 1135 receives (as output from the right bit shifter 1130) more bits than it outputs (e.g., receiving 32 bits but outputting a maximum of 16 bits).

Finally, the LUT 1140 implements the non-linear activation function. The full (e.g., 16-bit, 8-bit) output of the truncator 1135 is passed to the multiplexer 1145, while a subset of the output bits (e.g., 5 bits) are also split off to the LUT 1145. This LUT effectively implements a mapping table representing the activation function for the neural network computation node, and the multiplexer 1145 selects between the truncator output and the LUT output. The LUT configuration, in some embodiments, is the same for all nodes in a layer, which only requires one set of mapping table values to be sent as part of the neural network instructions. The multiplexer output is the neural network node output, which is gated by a valid signal (not shown) to indicate when the post-processing unit is outputting a completed activation value to be carried by the activation write bus to the appropriate core and stored in the activation memory of that core.

The use of a LUT rather than a hardwired non-linear function enables the use of different non-linear activation functions for different layers of a neural network as well as for different networks. For instance, in addition to common activation functions such as the Rectified Linear Unit (RELU), periodic activation functions, etc. are possible. In some embodiments, the lookup table circuit receives a truth-table (e.g., a 4-bit to 4-bit or 5-bit to 4-bit mapping) as configuration data in order to implement the non-linear activation function.

FIG. 12 illustrates an example of such a truth table 1200. This truth table is a 5-bit to 4-bit mapping for a Rectified Linear Unit (ReLU) function which, as described above, maps positive values to themselves and negative values to 0. As shown, when the most significant bit of the 5-bit input is 0 (for a positive number), the 4-bit output matches the other 4 bits of the input value. When the most significant bit of the 5-bit input is 1 (for a negative number), the 4-bit output is 0000. It should be noted that, in some embodiments, such a function could be implemented by the truncator 1135, in which case the multiplexer 1145 would be configured to select the truncator output rather than the LUT output. However, other, more complex activation functions are possible using the lookup table 1140. In some embodiments, periodic functions with can be implemented using the modulus function of the truncator 1135. In this case, the period of the period function is the full truth table provided to the lookup table 1140, with the modulus function meaning that only the 5 least significant bits of the output from the right bit shifter 1130 will affect the value output by the lookup table 1140.

FIG. 13, as mentioned, conceptually illustrates a dot product input processing circuit 1300 of some embodiments. As shown, the circuit 1300 receives the output of two dot product bus lanes (dot product input A and dot product input B). These inputs are each gated by AND gates 1305 and 1310, which use enable bits from the cluster controller to specify which dot product to use as input (or both), in certain cases. As mentioned above, in some embodiments each post-processing unit receives the output of a different corresponding dot product bus lane as its first dot product input (i.e., DP input A). That is, if there are N dot product bus lanes and N post-processing units in a cluster, then the nth post-processing unit receives its first dot product from the nth dot product bus lane. The second dot product input (i.e., DP input B) for each post-processing unit is from a different dot product bus lane in some embodiments.

In this example, the activation size has the option of being either a first size (e.g., 4-bit) or twice that size (e.g., 8-bit). In the simplest case, in which (i) the dot product for a node has few enough input/weight values to be performed in one cycle, (ii) the activation size is the smaller size, and (iii) there are no sparsity violations with the filter slices assigned to each core, then the remainder of the circuit 1300 effectively acts as a pass-through for the first dot product input (although the left shift circuit 1320 can also be used to align a dot product to ensure that the binary point is in the correct location for the input value). The AND gate 1305 enables this first dot product input, while the AND gate 1310 gates the second dot product to 0. However, in other situations, the adder 1315, left-shift operator 1320, and adder 1325 enable the dot product calculation for a neural network node to be completed and provided to the other post-processing operations.

Several other cases exist beyond the most simplistic case. One such situation occurs when one or more of the filter slices for a filter (a set of weights, typically divided across multiple cores, used to calculate numerous dot products for a layer) has more than a maximum allowed number of nonzero weights (e.g., one fourth of the weights in the filter slice, in the example described below). In this situation, several options are possible (with the compiler deciding among these options, in some embodiments) for splitting the filter. One option is to use a secondary filter slice buffer for the split filter slice (each filter slice, as stored in memory, includes a primary filter slice and a secondary filter slice, in some embodiments, and the filter slice buffers each include both primary and secondary buffers). This incurs an extra cycle of latency for each set of computation nodes that uses this filter. To account for this spare filter slice buffer, the initial dot product is held for a cycle (by the register 1330) and sent back through the AND gate 1335 (which is gated by both a signal from the post-processor controller and configuration data from the cluster controller) to the adder 1325. This initial dot product is combined with the dot product from the spare filter at the adder 1325.

A second option, available when not all of the filter slice buffers are needed for a layer of neural network nodes, is to map the split filter slice to the other filter slice buffer that maps as a secondary input to the post-processing unit corresponding to the split filter. In this case, the post-processing unit that receives the dot product resulting from the split filter has both its primary and secondary inputs enabled, and adds them together with adder 1315. This situation leaves another post-processing unit with its primary input used for this split filter, but if that post-processing unit is mapped to a filter that is not split, then its primary input can be disabled and secondary input enabled. The compiler can ripple the use of secondary inputs down the post-processing units in order to pack active post-processing units next to each other in some embodiments, which has the positive consequence of packing together activations on the activation write bus to be written to activation memory as a contiguous block. This option has the benefit of higher throughput, as a set of nodes is computed in a single cycle (rather than having to wait for the spare filter slice).

Another situation that requires the additional processing of the dot product input processing circuit 1300 is when the total dot product size (i.e., the number of dot product components) is too large to fit within a single set of activation slice buffers (and filter slice buffers) across all of the available cores. In this case, if there are no sparsity violations, the adder 1325 is again used along with the register 1330 and the AND gate 1335 to pass the initial partial dot product through, hold this value (in this case for several cycles, while a new set of input activation values are loaded from memory), and add the initial partial dot product to the secondary partial dot product, before outputting the combined value. If a sparsity violation requires a split filter in this situation, the secondary inputs are used for the split filter slices (in either the first pass, second pass, or both).

Lastly, for larger dot products (e.g., 8-bit rather than 4-bit activations), the same 4-bit circuitry is used in some embodiments. In this case, if there are no sparsity violations (i.e., no filter slices are split), then only the first input is used, over two passes. The first dot product pass represents the four most significant bits, and the left shifter 1320 shifts these bits before sending them to the adder 1325. The register 1330 then holds these bits while the second dot product pass is calculated. This secondary pass is not bit shifted, and the adder 1325 adds the two values together to arrive at the completed dot product. In the larger dot product case, if either pass requires split filters, then the secondary dot product input is used in the manner described above.

In addition to these dot product operations, in some embodiments the post-processing units include additional circuitry for performing operations for neural network computation nodes that do not use dot products. As noted above, the nodes of some neural network layers use computations that do not include dot products. For example, a convolutional neural network will typically include pooling layers that reduce the number of activations by performing a computation on spatially-proximate groups of activations (i.e., the outputs of spatially-proximate nodes). Typical pooling operations include average pooling (reducing a group of activations to a single activation value by computing the average of the activations) and max pooling (reducing a group of activations to a single activation value by selecting the maximum value of the activations). Element-wise operations, in some embodiments, use inputs from multiple layers that are the same shape, and add or multiply the corresponding elements from those layers.

FIG. 14, as mentioned, conceptually illustrates an ALU input processing circuit 1400 of some embodiments. As shown, the ALU input processing circuit 1400 receives a set of ALU inputs (in this case 3) from an ALU bus that carries activation values directly from the cores. A multiplexer 1405 selects one of these inputs (based on configuration data from the local cluster controller). The selected input is sent to the activation decoder 1410, which sign-extends the input value into (adding an extra bit to this value. For instance, a 4-bit input activation would be sign-extended into a 5-bit value.

The math circuit 1415 is a set of circuit blocks that performs operations on a pair of operands. The first operand is the decoded ALU input from the activation decoder 1410, and the second operand is either a preset value or the previous output of the math circuit 1415. Some embodiments also subject the first input to a reverse shift and scale, if needed, to put this input in the same number system as the second operand. The shift and scale values are determined by configuration data from the cluster controller, which also provides data to the math circuit 1415 to indicate which of a set of possible operations the math circuit 1415 performs in a given cycle.

In some embodiments, the math circuit 1415 can be configured to perform addition (e.g., for both element-wise addition and average pooling), multiplication (e.g., for element-wise multiplication) and comparison (for maximum pooling). Each of these operations requires multiple clock cycles, as only a single input can be received each cycle. The register 1420 holds the previous output of the math circuit 1415 until that output is required as an operand for the next operation of the math circuit 1415, or the operation is complete and the value is sent to the other post-processing operations (as shown in FIG. 11).

Figure 15:
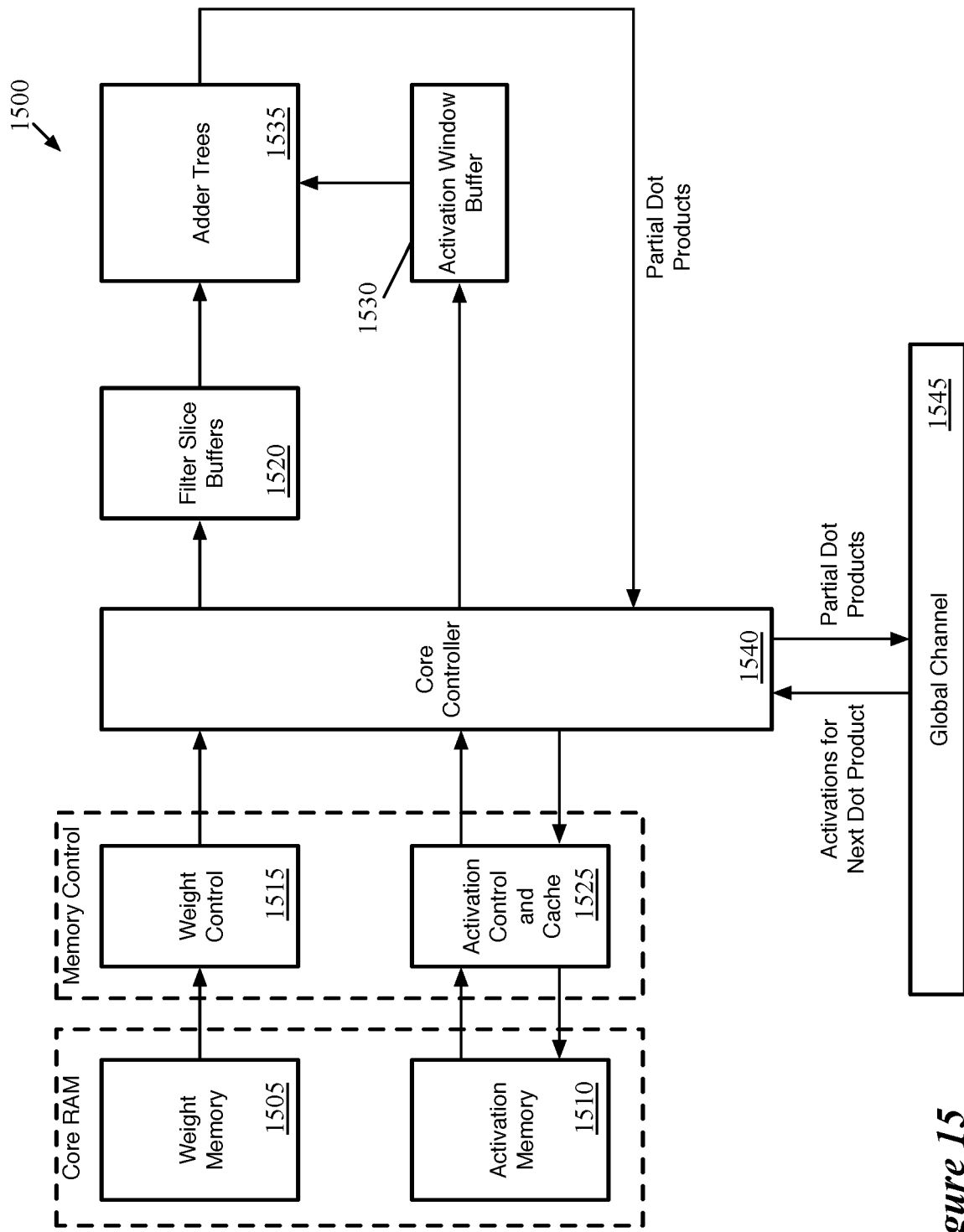
FIG. 15 conceptually illustrates the data flow within one of the cores of some embodiments for a dot product computation.

As mentioned, the dot product cores perform the majority of the computation of the chip fabric of some embodiments. FIG. 15 conceptually illustrates the data flow 1500 within one of the cores of some embodiments for a dot product computation. This data flow will be described with certain specifics (e.g., weight sizes, number of separate adder trees simultaneously computing partial dot products, etc.) as examples, but it should be understood that different embodiments may use different sizes for weight and/or activation values, different numbers of adder trees within a core, etc.

In some embodiments, the dot product cores store weight values (e.g., weights for multiple nodes in multiple layers) in the weight memory 1505 and activation values in the activation memory 1510. In some embodiments, as shown, these memories 1505 and 1510 are part of a single block of memory for the core (e.g., banks of random access memories such as SRAMs). In addition to storing weight and activation values, in some embodiments the microprocessor of the IC can use the memories in the cores as overflow memory (e.g., to store an image before the image is processed and provided as input to the neural network fabric).

The weight values are part of the network parameters and thus are determined at compile time (and do not change at runtime), while the activation values (the input values to a particular node being computed) are the output values from a previous computation (or, for the first layer, are otherwise based on the network input) and thus are determined at runtime. Thus, the weight memory 1505 is typically larger than the activation memory 1510 (e.g., 512 KB to 64 KB), as the activation memory is overwritten for each new computation while the weight memory 1505 stores the weights for all of the dot product computations performed by the core. In some embodiments, the weights are stored as 1-bit or 2-bit values (e.g., zeros stored as a single bit and negative/positive values stored as 2-bit 1/−1).

The weight controller 1515 reads data from the weight memory 1505 into a set of filter slice buffers 1520 that store the weight values to be used in the dot products. In some embodiments, as mentioned, a filter is a set of weights that is used to compute a dot product with a set of inputs (e.g., in order to identify a specific feature type within a portion of an image). Depending on the number of channels of the activation inputs, filters may be divided into multiple slices. Each filter, in some embodiments, is used repeatedly to compute dot products with numerous activation windows (e.g., contiguous sets of activation inputs). Some embodiments load 36 weight values into each filter slice buffer, which are actually used to compute 144 dot product components (with the requirement that at least 75% of the weight values be zero, the actual adder tree only receives 36 inputs for 144 activation values, as described in detail below). In some embodiments, each core includes numerous adder trees (e.g., 64) for simultaneously computing separate partial dot products and thus numerous filter slice buffers.

The activation controller 1525 reads data (input values) from the activation memory 1510 into the activation window buffer 1530. In addition, the activation controller 1525 arranges the input values within the activation window buffer 1530 in some embodiments to match up with the weight values in the filters. In some embodiments, the input values in an activation window read into the buffer 1530 include all of the values (as opposed to only 25% of the values), because the activation window is multiplied by numerous filters (i.e., some or all of the filters stored in the filter slice buffers). The input values, in some embodiments, are quantized to have a fixed size (e.g., 4 bits), or set of fixed sizes (e.g., 4 bits or 8 bits) for ease and simplicity of computation.

The adder trees 1545 compute the dot products between the weight values in the filter slice buffers 1520 and the input values in the activation window buffer 1530. The details of these partial dot product computation circuits of some embodiments are described below by reference to FIG. 16. These adder trees 1545 output partial dot products (e.g., 10-bit values) that are provided to the dot product bus, which combines the partial dot products with other partial dot products as described above.

The core controller 1540 configures and coordinates the operation of the memory controllers 1515 and 1525 in addition to the filter slice buffers 1520, activation window buffer 1530, and adder trees 1535. Furthermore, the core controller 1540 receives the input activations and weights from the memory controllers 1515 and 1525, and loads them into the correct slots in the filter slice buffers 1520 and activation window buffer 1530 (or directs them to the ALU bus for non-dot product computations. Lastly, when the adder trees 1535 output their partial dot product values, the core controller 1540 sends these values to the dot product bus in the global channel 1545. When the activations are output, the activation write bus carries these values to the core controller 1540, which provides them to the activation control 1525 to be written to activation memory 1510.

To reduce the circuit area and power required for dot product computations (which use the majority of resources for neural network inference), the partial dot product computation circuits (e.g., the adder trees 1535) of some embodiments map each of a first number of input values to a second number (e.g., 25% of the first number) of dot product inputs, such that each dot product input only receives at most one input value with a non-zero corresponding weight value. Specifically, in some embodiments, the partial dot product computation circuit includes at least two sets of wires for each input (activation) value, with each of the sets of wires for a given input value connected to at least two different dot product inputs (so that each input value can be provided to at least two different inputs). With a guarantee of at least 75% weight sparsity (i.e., at least 75% of the weight values for any set of input values are zero), the number of dot product inputs is set at 25% (or slightly more than 25%, for redundancy) of the number of input values loaded in an activation window for the dot product computation circuit. In some embodiments, the weight sparsity is guaranteed by the training algorithm used to train the weights to perform a specific purpose, and the IC is adaptable for any set of weights that meets the guarantee.

Figure 16:
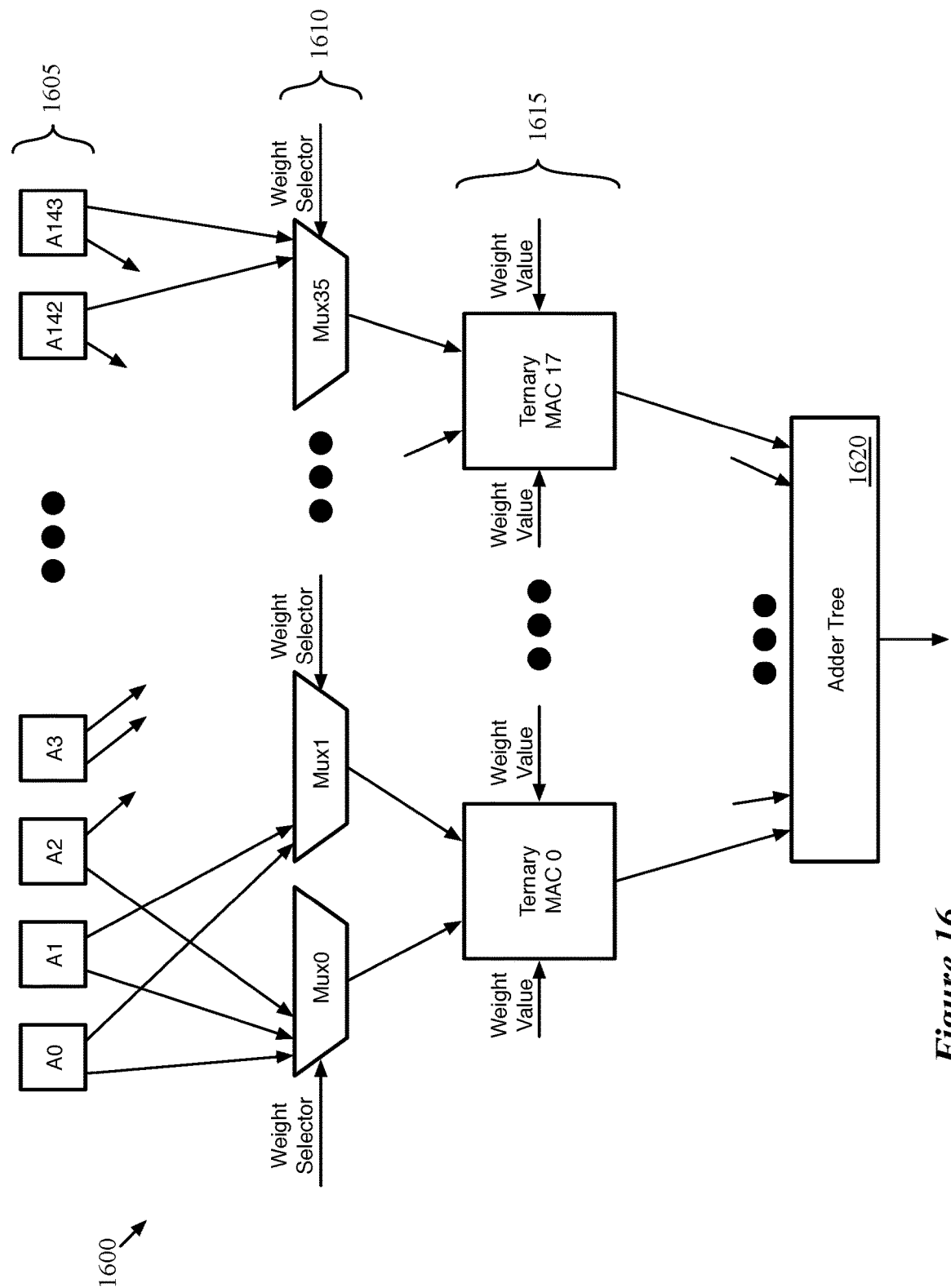
FIG. 16 conceptually illustrates an example of a partial dot product computation circuit for a guaranteed weight sparsity of at least 75%.

FIG. 16 conceptually illustrates an example of such a partial dot product computation circuit 1600 for a guaranteed weight sparsity of at least 75%. The wiring of the input values for this dot product computation circuit ensures that, so long as the weights meet the sparsity requirement, at runtime each input value with a nonzero corresponding weight value is provided to a different dot product input for nearly any arrangement of the nonzero weight values. As shown, the dot product computation circuit 1600 includes a set of activation inputs 1605, a set of multiplexers 1610, a set of ternary multiplier-accumulator (MAC) circuits 1615, and an adder tree 1620.

In this example, the dot product computation circuit 1600 includes 144 input values 1605. In different embodiments, the activation slice buffer may have different sizes, which defines the size of the partial dot product computation. Each input value storage (e.g., each buffer location) is connected to two of the thirty-six multiplexers 1610. In this example, at least 75% sparsity is assumed for each set of weight values, and thus the 144 activation inputs can be reduced to 36 inputs to the actual dot product computation. This significantly reduces the circuit area required for the dot product computation, as the number of adders is reduced by 75% (the adder tree effectively starts with 36 values rather than 144 values).

The multiplexers 1610 each have eight inputs and receive a set of select bits (the weight selector input) from the core controller that specifies which of these eight inputs to pass to the dot product computation. Having thirty-six 8-input multiplexers 1610 allows for 288 sets of wires from the activation inputs 1605 to the multiplexers 1610, which is two wires for each activation input. If the sparsity guarantee was only 50%, then seventy-two 4-input multiplexers could be used with two sets of wires for each activation input 1605 (or seventy-two 8-input multiplexers with four sets of wires for each activation input 1605), with similar proportions for different sparsity guarantees and numbers of wires per activation input.

The wire sets from the activation inputs to the multiplexers are arranged such that each input value with a nonzero corresponding weight is provided to a different one of the multiplexers 1610. The weight values are not known at the time of IC manufacture, and thus the wiring design is resilient to different arrangements of the nonzero weight values (that meet the sparsity requirement). Some embodiments use a cuckoo hashing algorithm (or other algorithm) to optimally map the wire sets from the activation inputs 1605 to the multiplexers 1610. In some embodiments, this algorithm computes two hashes (e.g., with two different hash functions) for each of the activation input locations 1605 that map to two different multiplexers 1610 (e.g., by computing the hash modulo 36). Each activation input location 1605 is wired to these two different multiplexers 1610 determined by the hashes. If one of the hash functions maps an activation input to a multiplexer that already has eight inputs, then some embodiments compute a third hash function for either that activation input or one of the activation inputs previously mapped to the multiplexer.

Other embodiments use other techniques to select the multiplexers to which each input value is wired, so long as each input is wired to two different multiplexers (and thus each multiplexer has input wires from eight different activation inputs). Additional constraints may be imposed as well, such as ensuring that no more than a specified maximum number of activation inputs are wired to the same pair of multiplexers. In addition, it should be understood that these techniques can be applied to dot product computation circuits with different numbers of inputs, different numbers of multiplexers, and different numbers of wires per input.

The weight values are known before the network is executed by the IC (i.e., at compile time), and thus the compiler can determine which of the two multiplexers that receive each input value with a non-zero corresponding weight at runtime will select that input value, such that each input value is selected by a different multiplexer (and only one multiplexer). In some embodiments, the compiler uses the same cuckoo hashing or other algorithm as was used for the wires. The select bits for the multiplexers 1610 are determined by which of the inputs to the multiplexer carries an input activation value with a nonzero corresponding weight value, and are received from the core controller. These multiplexers 1610 provide their output to a set of ternary multiply-accumulator (MAC) circuits 1615. The ternary MAC circuits effectively form the leaves of the dot product computation, and the number of such circuits is half the number of multiplexers 1610 (18 ternary MAC circuits 1615 in this example).

In some embodiments, the weight values for a particular dot product computation are all either zero, a positive value, or the negation of the positive value in some embodiments. In this case, the dot product does not require any actual multiplication at the leaves of the computation, as the positive and negative weight values can be treated as 1 and −1, with a single multiplication by the positive value afterwards. Removing the multiplication at the leaves saves significant circuit area for a chip with numerous such computation circuits.

To combine the two input values while accounting for the ternary weight values, the ternary MAC circuits 1615 add the two input values from the multiplexers 1610 while also receiving as inputs the corresponding weight values for these input values (or configuration bits generated based on the weight values). If both of the weights are positive, then the ternary MAC outputs the sum of the two input values (and outputs the negative of this sum if both of the weights are negative). If only one of the weight values is negative, then its corresponding input value is subtracted from the other input value (with a positive corresponding weight value), and if both of the weight values are zero, then the ternary MAC output is zero. Lastly, if only one of the weight values is zero, then the ternary MAC outputs the input value (or the negative of the input value) with the corresponding nonzero weight value). The negative values are accounted for in the bias computation within the post-processing unit, as described above.

The outputs of the ternary MACs provide the inputs to the adder tree 1620 that computes the output for the partial dot product computation. In some embodiments, this adder tree is a standard adder tree circuit that adds pairs of values over several layers. For example, the adder tree 1620 receives 18 inputs for 9 adders, which in turn provide outputs to 4 adders (with an additional output to be added in later), etc. In some embodiments, the inputs to the ternary MACs 1615 are 4-bit inputs (the length of the quantized activation values), and the ternary MACs 1615 output 6-bit values. The adder tree 1620 receives these 6-bit values and outputs a 10-bit value after several stages of addition.

While this diagram shows the wires (or some of the wires) connecting the input value 1605 to a single partial dot product computation circuit, in some embodiments each of these input values 1605 in the activation slice buffer is actually connected to each of the partial dot product computation circuits in the core. That is, for the case with 64 such circuits, each value in the activation slice register is carried by 128 total wires to 128 multiplexers (two for each of the partial dot product computation circuits). In some embodiments, the wiring arrangement is the same for each set of multiplexers (i.e., for each partial dot product computation circuit).

As mentioned, for redundancy, some embodiments use a number of dot product inputs (i.e., multiplexers) that is slightly more than required by the sparsity guarantee for the dot product computation. For instance, in the example above, rather than using 36 inputs (exactly 25% of the 144 input values), some embodiments use 38 or 40 inputs. In this case, some of the activations 1605 are mapped to three of the multiplexers 1610, rather than two.

Figure 17:
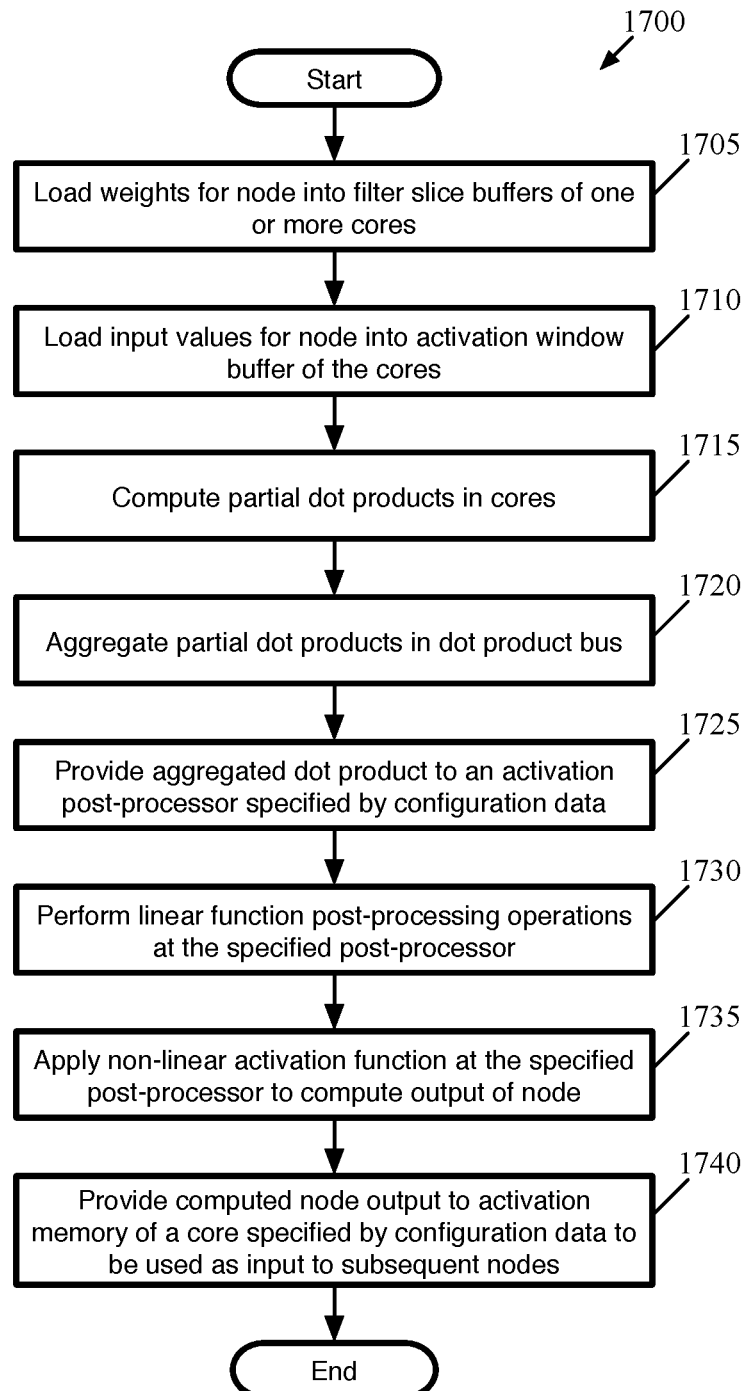
FIG. 17 conceptually illustrates a process of some embodiments for executing a set of instructions (or a portion of a set of instructions) to compute the output of a neural network node.

FIG. 17 conceptually illustrates a process 1700 of some embodiments for executing a set of instructions (or a portion of a set of instructions) to compute the output of a neural network node (specifically, a convolutional or fully-connected node). The process 1700 is executed by the chip fabric of a neural network IC, such as that described above. Typically, the process 1700 is executed simultaneously for multiple nodes, and will be performed repeatedly for multiple activation windows (i.e., multiple groups of input values loaded into the activation slice buffer) in order to completely execute a layer of the neural network. In the case of the process 1700, the dot product can be computed in a single cycle and does not involve any split filter slices.

As shown, the process begins (at 1705) by loading the weights for a node into filter slice buffers of one or more cores. In addition, the process loads (at 1710) the input (activation) values for the node into the activation window buffer of these cores. In some embodiments, a set of input values are loaded into one activation window buffer in a core while the weight values for several nodes are loaded into several filter slice buffers of the core. In addition, the weights and activations for a node, in some embodiments, are divided among the filter slice buffers of all of the cores that are active for the current set of instructions.

The process 1700 then computes (at 1715) partial dot products in the cores. As described above by reference to FIGS. 15 and 16, the activation values loaded into the activation slice buffers in each of the active cores are multiplied by their corresponding weight values loaded into the filter slice buffers of these cores. In some embodiments, the size of the partial dot products is reduced using the wiring structure shown in FIG. 16, and with ternary weight values of {0, 1, −1}, the multiplication is handled by the ternary MAC circuits shown in this figure.

Next, the process aggregates (at 1720) these partial dot products in the dot product bus. In some embodiments, the partial dot products for a particular node are calculated by the adder tree with the same index (i.e., out of several adder trees) in each of the active cores, and thus these partial dot products are all passed to the same corresponding lane of the dot product bus (which has one lane for each of the adder trees in a core). In some embodiments, the final aggregation is performed by the dot product bus lane in the channel segment of the post-processor selected for the particular node.

The process 1700 then provides (at 1725) the aggregated dot product to an activation post-processor specified by configuration data. This configuration data, in some embodiments, is generated by a compiler and parsed by the hierarchical controller circuits of the neural network chip fabric, and indicates which channel segment will perform the post-processing. Each of the channel segments has an equal number of post-processing units, and the post-processing unit in the selected channel that corresponds to the dot product bus lane that aggregates the dot product is the post-processing unit that receives the aggregated dot product.

At the post-processing unit that receives the aggregated dot product, the process 1700 performs (at 1730) linear function post-processing operations. For all dot products, this includes the bias and scale operations described by reference to FIG. 11 above, with the values for these operations sent as configuration data from the cluster controller. In addition, certain dot products are aggregated over multiple cycles by the dot product input processing circuit shown in FIG. 13 (e.g., if time-multiplexing is required to handle dot products with a large number of components, or for dot products with double the standard number of bits).

Next, the process 1700 applies (at 1735) the non-linear activation function at the post-processing unit to complete the calculation of the node output value. In some embodiments, as shown in FIG. 11, a lookup table is used for this computation (e.g., a 5-bit to 4-bit mapping table). The mapping for each possible set of input bits is provided by configuration data from the cluster controller in some embodiments.

In some embodiments, the operations 1715-1735 are executed to compute the node output without storing the any intermediate values in memory. That is, none of the partial dot products are stored in any memories (e.g., RAM) during the computation within the core, and the same is true before and during the aggregation within the dot product bus. As described by reference to FIG. 13, in some embodiments the register 1330 is used to aggregate multiple dot product bus input. However, in a standard case (e.g., for 4-bit dot products), the register 1330 passes the dot product input through and the entire set of operations 1715-1735 is executed in a single clock cycle.

Finally, the process 1700 provides the computed node output to the activation memory of one (or more) of the cores as specified by the configuration data, so that this output can be used as the input to a subsequent set of neural network nodes. In some embodiments, the node output value is carried to the specified core by the activation write bus, with the core index for the value specified by the cluster controller(s).

The integrated circuit of some embodiments can be embedded into various different types of devices in order to perform different purposes (e.g., face recognition, object categorization, voice analysis, etc.). For each type of device, a network is trained, obeying the sparsity and/or ternary constraints, with the network parameters stored with the IC to be executed by the IC on the device. These devices can include mobile devices, desktop computers, Internet of Things (IoT devices), etc.

Figure 18:
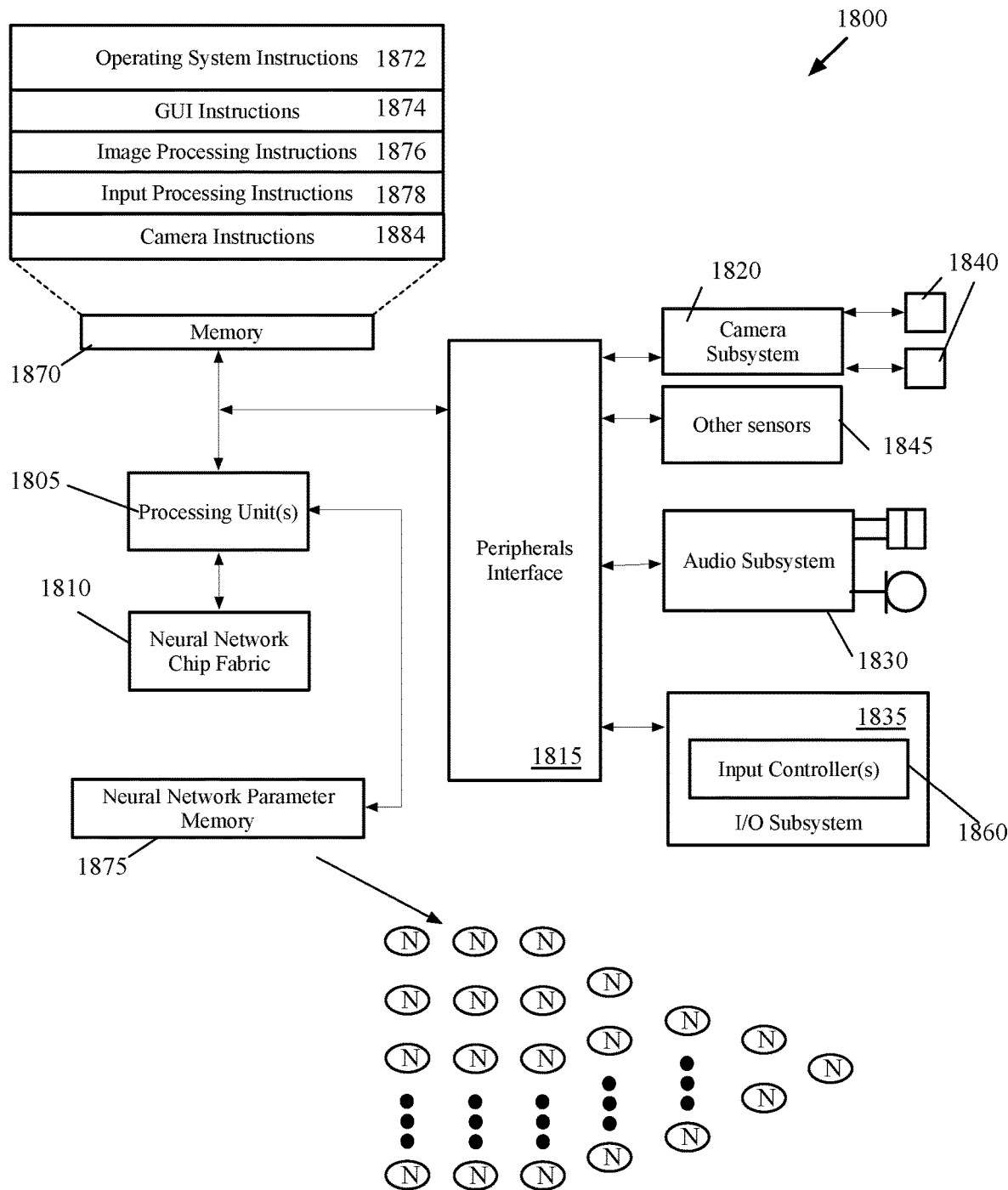
FIG. 18 is an example of an architecture of an electronic device that includes the neural network integrated circuit of some embodiments.

FIG. 18 is an example of an architecture 1800 of an electronic device that includes the neural network integrated circuit of some embodiments. The electronic device may be a mobile computing device such as a smartphone, tablet, laptop, etc., or may be another type of device (e.g., an IoT device, a personal home assistant). As shown, the device 1800 includes one or more general-purpose processing units 1805, a neural network chip fabric 1810, and a peripherals interface 1815.

The peripherals interface 1815 is coupled to various sensors and subsystems, including a camera subsystem 1820, an audio subsystem 1830, an I/O subsystem 1835, and other sensors 1845 (e.g., motion/acceleration sensors), etc. The peripherals interface 1815 enables communication between the processing units 1805 and various peripherals. For example, an orientation sensor (e.g., a gyroscope) and an acceleration sensor (e.g., an accelerometer) can be coupled to the peripherals interface 1815 to facilitate orientation and acceleration functions. The camera subsystem 1820 is coupled to one or more optical sensors 1840 (e.g., charged coupled device (CCD) optical sensors, complementary metal-oxide-semiconductor (CMOS) optical sensors, etc.). The camera subsystem 1820 and the optical sensors 1840 facilitate camera functions, such as image and/or video data capturing.

The audio subsystem 1830 couples with a speaker to output audio (e.g., to output voice navigation instructions). Additionally, the audio subsystem 1830 is coupled to a microphone to facilitate voice-enabled functions, such as voice recognition, digital recording, etc. The I/O subsystem 1835 involves the transfer between input/output peripheral devices, such as a display, a touch screen, etc., and the data bus of the processing units 1805 through the peripherals interface 1815. The I/O subsystem 1835 various input controllers 1860 to facilitate the transfer between input/output peripheral devices and the data bus of the processing units 1805. These input controllers 1860 couple to various input/control devices, such as one or more buttons, a touch-screen, etc.

In some embodiments, the device includes a wireless communication subsystem (not shown in FIG. 18) to establish wireless communication functions. In some embodiments, the wireless communication subsystem includes radio frequency receivers and transmitters and/or optical receivers and transmitters. These receivers and transmitters of some embodiments are implemented to operate over one or more communication networks such as a GSM network, a Wi-Fi network, a Bluetooth network, etc.

As illustrated in FIG. 18, a memory 1870 (or set of various physical storages) stores an operating system (OS) 1872. The OS 1872 includes instructions for handling basic system services and for performing hardware dependent tasks. The memory 1870 also stores various sets of instructions, including (1) graphical user interface instructions 1874 to facilitate graphic user interface processing; (2) image processing instructions 1876 to facilitate image-related processing and functions; (3) input processing instructions 1878 to facilitate input-related (e.g., touch input) processes and functions; and (4) camera instructions 1884 to facilitate camera-related processes and functions. The processing units 1810 execute the instructions stored in the memory 1870 in some embodiments.

The memory 1870 may represent multiple different storages available on the device 1800. In some embodiments, the memory 1870 includes volatile memory (e.g., high-speed random access memory), non-volatile memory (e.g., flash memory), a combination of volatile and non-volatile memory, and/or any other type of memory.

The instructions described above are merely exemplary and the memory 1870 includes additional and/or other instructions in some embodiments. For instance, the memory for a smartphone may include phone instructions to facilitate phone-related processes and functions. An IOT device, for instance, might have fewer types of stored instructions (and fewer subsystems), to perform its specific purpose and have the ability to receive a single type of input that is evaluated with its neural network.

The above-identified instructions need not be implemented as separate software programs or modules. Various other functions of the device can be implemented in hardware and/or in software, including in one or more signal processing and/or application specific integrated circuits.

In addition, a neural network parameter memory 1875 stores the weight values, bias parameters, etc. for implementing one or more machine-trained networks by the neural network chip fabric 1810. As mentioned above, different clusters of cores of the fabric 1810 can implement different machine-trained networks in parallel in some embodiments. In different embodiments, these neural network parameters are stored on-chip (i.e., in memory that is part of the neural network chip fabric 1810) or loaded onto the IC 1810 from the neural network parameter memory 1875 via the processing unit(s) 1805.

While the components illustrated in FIG. 18 are shown as separate components, one of ordinary skill in the art will recognize that two or more components may be integrated into one or more integrated circuits. In addition, two or more components may be coupled together by one or more communication buses or signal lines (e.g., a bus between the general-purpose processing units 1805 and the neural network IC 1810, which enables the processing units 1805 to provide inputs to the neural network IC 1810 and receive the outputs of the network from the IC 1810. Also, while many of the functions have been described as being performed by one component, one of ordinary skill in the art will realize that the functions described with respect to FIG. 18 may be split into two or more separate components.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 19:
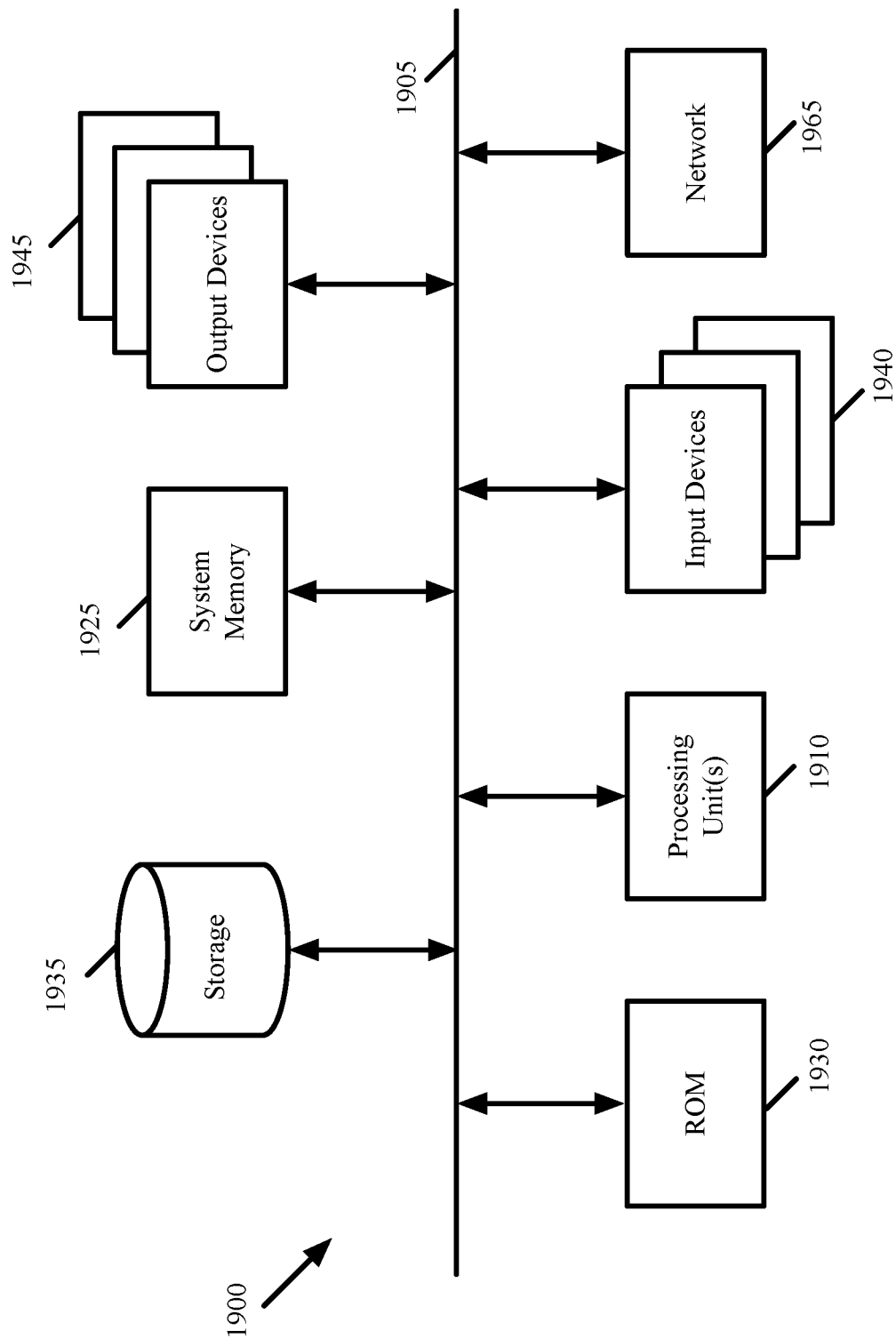
FIG. 19 conceptually illustrates an electronic system with which some embodiments of the invention are implemented.

FIG. 19 conceptually illustrates an electronic system 1900 with which some embodiments of the invention are implemented. The electronic system 1900 can be used to execute any of the control and/or compiler systems described above in some embodiments. The electronic system 1900 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1900 includes a bus 1905, processing unit(s) 1910, a system memory 1925, a read-only memory 1930, a permanent storage device 1935, input devices 1940, and output devices 1945.

The bus 1905 collectively represents all system, peripheral, and chipset buses that communicatively connect the numerous internal devices of the electronic system 1900. For instance, the bus 1905 communicatively connects the processing unit(s) 1910 with the read-only memory 1930, the system memory 1925, and the permanent storage device 1935.

From these various memory units, the processing unit(s) 1910 retrieves instructions to execute and data to process in order to execute the processes of the invention. The processing unit(s) may be a single processor or a multi-core processor in different embodiments.

The read-only-memory (ROM) 1930 stores static data and instructions that are needed by the processing unit(s) 1910 and other modules of the electronic system. The permanent storage device 1935, on the other hand, is a read-and-write memory device. This device is a non-volatile memory unit that stores instructions and data even when the electronic system 1900 is off. Some embodiments of the invention use a mass-storage device (such as a magnetic or optical disk and its corresponding disk drive) as the permanent storage device 1935.

Other embodiments use a removable storage device (such as a floppy disk, flash drive, etc.) as the permanent storage device. Like the permanent storage device 1935, the system memory 1925 is a read-and-write memory device. However, unlike storage device 1935, the system memory is a volatile read-and-write memory, such a random-access memory. The system memory stores some of the instructions and data that the processor needs at runtime. In some embodiments, the invention's processes are stored in the system memory 1925, the permanent storage device 1935, and/or the read-only memory 1930. From these various memory units, the processing unit(s) 1910 retrieves instructions to execute and data to process in order to execute the processes of some embodiments.

The bus 1905 also connects to the input and output devices 1940 and 1945. The input devices enable the user to communicate information and select commands to the electronic system. The input devices 1940 include alphanumeric keyboards and pointing devices (also called "cursor control devices"). The output devices 1945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 19, bus 1905 also couples electronic system 1900 to a network 1965 through a network adapter (not shown). In this manner, the computer can be a part of a network of computers (such as a local area network ("LAN"), a wide area network ("WAN"), or an Intranet, or a network of networks, such as the Internet. Any or all components of electronic system 1900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itsel.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, some of the figures (including FIGS. 6 and 17) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. For a neural network inference circuit that implements a neural network comprising a plurality of computation nodes at a plurality of layers, each computation node comprising a dot product of input values and weight values and a set of post-processing operations, a method comprising:
   retrieving a set of weight values for a particular computation node and a set of input values for the particular computation node from a set of memories of the neural network inference circuit;
   computing a dot product of the set of weight values and the set of input values;
   performing the set of post-processing operations for the particular computation node on a result of the dot product computation to compute an output value for the particular computation node; and
   storing the output value for the particular computation node in the set of memories,
   wherein no intermediate results of the dot product or the set of post-processing operations are stored in any random access memory (RAM) of the neural network inference circuit during the computation.

2. The method of claim 1, wherein the computation of the dot product and the performance of the set of post-processing operations occur within a single clock cycle of the IC.

3. The method of claim 1, wherein the stored output is used as an input value to a second computation node.

4. The method of claim 1, wherein the stored output is used as an input value for a plurality of additional computation nodes.

5. The method of claim 4, wherein the particular computation node is part of a first layer of the neural network and the additional computation nodes are part of a second layer of the neural network that is subsequent to the first layer.

6. The method of claim 5, wherein the set of input values are stored outputs of computation nodes of a third layer of the neural network that is executed prior to the first layer.

7. The method of claim 1, wherein retrieving the set of weight values and the set of input values comprises performing memory read operations to load the weight values and the input values from RAM of the neural network inference circuit to sets of buffers.

8. The method of claim 7, wherein computing the dot product comprises:
   computing a plurality of partial dot products in a plurality of cores of the neural network inference circuit; and
   aggregating the partial dot products using an aggregation bus that connects to the plurality of cores.

9. The method of claim 1, wherein no intermediate results of the dot product are stored in any storage of the neural network inference circuit during the computation.

10. The method of claim 1, wherein an intermediate result of the dot product is stored in a register of the neural network inference circuit while an additional portion of the dot product is calculated.

11. The method of claim 10, wherein computing the dot product comprises:
   computing a first dot product of a first subset of the set of weight values and a first subset of the set of input values;
   storing the first dot product in the register;
   computing a second dot product of a second subset of the set of weight values and a second subset of the set of input values; and
   adding the first and second dot products together.

12. The method of claim 1, wherein performing the set of post-processing operations comprises:
   adding a bias factor for the computation node to the result of the dot product computation;
   multiplying a result from the addition by a scaling factor for the computation node;
   truncating a result of the multiplication; and
   applying a non-linear activation function to a result of the truncation.

13. The method of claim 12 further comprising receiving the bias factor, the scaling factor, and a mapping table for the non-linear activation function as configuration data.

14. A neural network inference circuit that implements a neural network comprising a plurality of computation nodes at a plurality of layers, each computation node comprising a dot product of input values and weight values and a set of post-processing operations, the neural network inference circuit comprising:
   a set of memory control circuits to retrieve a set of weight values for a particular computation node and a set of input values for the particular computation node from a set of memories of the neural network inference circuit;
   a set of dot product circuits to compute a dot product of the set of weight values and the set of input values;
   a post-processing circuit to perform the set of post-processing operations for the particular computation node on a result of the dot product computation to compute an output value for the particular computation node; and
   a set of circuits to store the output value for the particular computation node in the set of memories,
   wherein no intermediate results of the dot product or the set of post-processing operations are stored in any random access memory (RAM) of the neural network inference circuit during the computation.

15. The neural network inference circuit of claim 14, wherein the computation of the dot product and the performance of the set of post-processing operations occur within a single clock cycle of the IC.

16. The neural network inference circuit of claim 14, wherein the stored output is used as an input value for a plurality of additional computation nodes, wherein the particular computation node is part of a first layer of the neural network and the additional computation nodes are part of a second layer of the neural network that is executed subsequent to the first layer.

17. The neural network inference circuit of claim 16, wherein the set of input values are stored outputs of computation nodes of a third layer of the neural network that is executed prior to the first layer.

18. The neural network inference circuit of claim 14, wherein the set of memory control circuits retrieves the set of weight values and the set of input values by performing memory read operations to load the weight values and the input values from RAM of the neural network inference circuit to sets of buffers.

19. The neural network inference circuit of claim 18, wherein the set of dot product circuits comprises:
a set of partial dot product computation circuits in a plurality of cores of the neural network inference circuit to compute a plurality of partial dot products; and
an aggregation bus that connects to the plurality of cores to aggregate the partial dot products.

20. The neural network inference circuit of claim 14, wherein no intermediate results of the dot product are stored in any storage of the neural network inference circuit during the computation.

21. The neural network inference circuit of claim 1, wherein an intermediate result of the dot product is stored in a register of the neural network inference circuit while an additional portion of the dot product is calculated.

22. A non-transitory machine-readable medium storing a program, for execution by at least one processing unit, that configures a neural network inference circuit that implements a neural network comprising a plurality of computation nodes at a plurality of layers, each computation node comprising a dot product of input values and weight values and a set of post-processing operations, the program comprising sets of instructions for:
configuring a set of memory control circuits to retrieve a set of weight values for a particular computation node and a set of input values for the particular computation node from a set of memories of the neural network inference circuit;
configuring a set of dot product circuits to compute a dot product of the set of weight values and the set of input values;
configuring a post-processing circuit to perform the set of post-processing operations for the particular computation node on a result of the dot product computation to compute an output value for the particular computation node; and
configuring a set of circuits to store the output value for the particular computation node in the set of memories, wherein no intermediate results of the dot product or the set of post-processing operations are stored in any random access memory (RAM) of the neural network inference circuit during the computation.

23. The non-transitory machine-readable medium of claim 22, wherein the set of instructions for configuring the set of dot product circuits comprises sets of instructions for:
configuring the set of dot product circuits to compute a first dot product of a first subset of the set of weight values and a first subset of the set of input values;
configuring a register to store the first dot product in the register;
configuring the set of dot product circuits to compute a second dot product of a second subset of the set of weight values and a second subset of the set of input values; and
configuring an adder circuit to add the first and second dot products together.

24. The non-transitory machine-readable medium of claim 22, wherein the set of instructions for configuring the post-processing circuit comprises sets of instructions for:
configuring an adder circuit to add a bias factor for the computation node to the result of the dot product computation;
configuring a multiplier circuit to multiply a result from the addition by a scaling factor for the computation node;
configuring a truncator circuit to truncate a result of the multiplication; and
configuring a circuit to apply a non-linear activation function to a result of the truncation.

* * * * *